United States Patent
Lim et al.

(10) Patent No.: US 8,416,776 B2
(45) Date of Patent: Apr. 9, 2013

(54) COMMUNICATION CHANNEL BUILDING DEVICE AND N-TREE BUILDING METHOD

(75) Inventors: Boon Ping Lim, Kuala Lumpur (MY); Ettikan Kandasamy Karuppiah, Kuala Lumpur (MY); Pek Yew Tan, Singapore (SG); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/993,210

(22) PCT Filed: Jun. 11, 2009

(86) PCT No.: PCT/JP2009/002647
§ 371 (c)(1),
(2), (4) Date: Nov. 17, 2010

(87) PCT Pub. No.: WO2009/153945
PCT Pub. Date: Dec. 23, 2009

(65) Prior Publication Data
US 2011/0064079 A1  Mar. 17, 2011

(30) Foreign Application Priority Data
Jun. 19, 2008  (JP) .................................. 2008-160916

(51) Int. Cl.
*H04L 12/28* (2006.01)
*H04L 12/56* (2006.01)

(52) U.S. Cl.
USPC ........................................................ 370/390

(58) Field of Classification Search ........................ None
See application file for complete search history.

(56) References Cited

U.S. PATENT DOCUMENTS

| | | | |
|---|---|---|---|
| 7,450,580 B2* | 11/2008 | Itonaga et al. | 370/392 |
| 7,778,273 B2* | 8/2010 | Luo et al. | 370/465 |
| 7,792,936 B2* | 9/2010 | Liu et al. | 709/223 |
| 8,243,630 B2* | 8/2012 | Luo et al. | 370/261 |

(Continued)

FOREIGN PATENT DOCUMENTS

| | | |
|---|---|---|
| JP | 2007-251805 | 9/2007 |
| JP | 2009-213120 | 9/2009 |

OTHER PUBLICATIONS

Daisuke Hasegawa et al., "Resource Assignment and Relay Tree Construction Scheme Based on Users' Demands of Quality for Real-Time Communication with Multi-User", IEICE technical report. Information networks, vol. 105, No. 279, pp. 137-142 (Sep. 2005).

(Continued)

*Primary Examiner* — Phirin Sam
*Assistant Examiner* — Blanche Wong
(74) *Attorney, Agent, or Firm* — Greenblum & Bernstein, P.L.C.

(57) ABSTRACT

Disclosed is a communication channel building device which can guarantee a fair bandwidth allocation and exhibit a preferable perception AV quality in an ALM application. A transfer table building controller controls building of a distribution type optimal channel table over a plurality of communication nodes. A group constructor distributes communication nodes to a group dedicated for a specific source in accordance with the communication node display resolution and the content type and assigns a priority to the group for the specific source. A bandwidth allocator temporarily allocates a bandwidth which can be used for a logic stream between communication nodes. A transfer table constructor builds a distribution type optimal channel table according to the priority of the group for the specific source.

16 Claims, 17 Drawing Sheets

U.S. PATENT DOCUMENTS

| | | |
|---|---|---|
| 2005/0163224 A1 | 7/2005 | Shin et al. |
| 2006/0153100 A1 | 7/2006 | Dube et al. |
| 2007/0133413 A1 | 6/2007 | Pepperell |
| 2009/0167841 A1* | 7/2009 | Wu et al. .................. 348/14.08 |
| 2011/0002333 A1 | 1/2011 | Karuppiah et al. |

OTHER PUBLICATIONS

Puneet Mehra et al., "Receiver-driven bandwidth sharing for TCP", Proceedings of IEEE Transactions on Multimedia, vol. 7, Issue 4, pp. 740-752 (Aug. 2005).

Toshiaki Osada et al., "Iterative Application Layer Multicast Tree Construction Method for Many-to-Many Multimedia Communication", The transactions of the IEICE.B J92-B(1), pp. 98-108 (Jan. 2009).

Kenichiro Takano et al., "Application Multicast Construction Method Tree for Many-to-Many Videoconferencing System", IPSJ SIG Notes vol. 2005 No. 58, pp. 41-46 (Jun. 2005).

* cited by examiner

| | | |
|---|---|---|
| GROUP ID | | ～2002 |
| GROUP PRIORITY | | ～2004 |
| CONTENT GROUP ID | | ～2006 |
| RECEIVER ID [1...n] | | ～2008 |
| STREAM ID [1...n] | | ～2010 |

FIG.4

| | | |
|---|---|---|
| STREAM ID | | ～2102 |
| SENDER ID | | ～2104 |
| RECEIVER ID | | ～2106 |
| CONNECTION INFORMATION | | ～2108 |

FIG.5

| | | |
|---|---|---|
| CONTENT GROUP ID | | ～2202 |
| DISPLAY RESOLUTION | | ～2204 |
| CONTENT TYPE | | ～2206 |
| WEIGHT INFORMATION | | ～2208 |

FIG.6

| GROUP ID | | ~ 2302 |
|---|---|---|
| PRIORITY INFORMATION | | ~ 2304 |

FIG.7

| SENDER ID | | ~ 2402 |
|---|---|---|
| RECEIVER ID | | ~ 2404 |
| ESTIMATED LINK BANDWIDTH | | ~ 2406 |
| STREAM ID[1...n] | | ~ 2408 |

FIG.8

| STREAM ID | | ~ 2502 |
|---|---|---|
| ESTIMATED BANDWIDTH | | ~ 2504 |

FIG.9

| GROUP ID | | | ~ 2602 |
|---|---|---|---|
| PATH ID | | | ~ 2604 |
| SELECTED STREAM ID | | | ~ 2606 |
| ACTUAL ESTIMATED BANDWIDTH | | | ~ 2608 |

FIG.10

COMMUNICATION CHANNEL BUILDING DEVICE AND N-TREE BUILDING METHOD

TECHNICAL FIELD

The present invention generally relates to optimal path construction for packet forwarding. More particularly, the present invention relates to optimal path construction for application layer multicasting (ALM) over packet-based network. In particular, the present invention relates to a communication path construction apparatus and an N-tree construction method for fair bandwidth allocation in N source-specific paths.

BACKGROUND ART

Multipoint communication, in particular, multipoint communication over the Internet, is broadly performed by a multicast method for simultaneously delivering the same content to all participating nodes in session. Due to the complexity of intermediate node configuration, end node configuration and requirements for internet service provider participation for enabling IP layer multicasting, widespread of IP (internet protocol) multicast has been hampered.

On the other hand, a new mechanism, called "application layer multicasting (ALM)," has been known. ALM is becoming popular due to its simplicity of application layer implementation on an existing unicast network architecture. ALM allows AV (Audio Video) packet forwarding by members themselves among participating nodes because of no need for multicast forwarding function in the IP layer. In addition, ALM allows flexible AV packet forwarding in the application layer.

With ALM, AV contents or streams can be exchanged among all participants in a specific session without prior environmental setting. Therefore, ALM is very useful for AV-based applications such as video conferencing between a plurality of parties (see Patent Literatures 1, 2 and 3).

With ALM, since packet routing is performed in the application layer, each participating node has to form a source-based tree for data packet distribution. That is, with ALM, N participating nodes constructs a distribution tree of N source contents in the application layer in order to perform N-to-N communication.

On the other hand, a network layer routing mechanism is a selection mechanism solely based on measured latency (e.g. round-trip time), so that it is difficult to provide solutions for fair bandwidth allocation. Here, the network layer routing mechanism includes "minimum spanning tree (MST)" which is based on "greedy" concept of Dijkstra, Bellman-Ford and Prim algorithms for shortest path formation.

In addition, Non-Patent Literature 1 discloses a bandwidth allocation method for a plurality of streams, based on user preference, for example, wish to prioritize an interested video.

Unicast packet routing on the Internet forms shortest path based on the above-described algorithms and does not reflect ALM routing requirement. Thus, these solutions are best for network layer unicast routing but not for ALM-based application.

Citation List

Patent Literature

[PTL 1] U.S. Patent Application Publication No. 2005/0163224

[PTL 2] U.S. Patent Application Publication No. 2006/0153100

[PTL 3] U.S. Patent Application Publication No. 2007/0133413

Non-Patent Literature

[NPL 1] Puneet Mehra et al. "Receiver-driven bandwidth sharing for TCP", Proceedings of IEEE Transactions on Multimedia, Volume 7, Issue 4, August 2005

SUMMARY OF INVENTION

Technical Problem

The above-described algorithms for shortest path formation are not aware of the end node network bandwidth and the entire network topology. Accordingly, if these algorithms are applied to ALM applications, traffic congestion occurs in a path shared between ALM nodes, network latency becomes longer and AV quality deteriorates. In addition, the method disclosed in Non-Patent Literature 1 does not take into account bandwidth contention in N-to-N distribution tree (N-tree), and therefore it is difficult to use to construct fair bandwidth allocation tree.

It is known that the problem of finding an N-tree that assures fair bandwidth allocation by a round robin method is NP-hard. That is, it is not a problem that can be solved in N polynomial time, for example, in time corresponding to $N^3$ and $N^4$ (N=the number of nodes), but is a problem that, if N increases to such as $N^N$, the calculation amount explosively increases. That is, there has been a problem that the time to calculate N-tree explosively increases as the number of nodes increases, and consequently calculation of N-tree is not completed in a practical period of time.

In view of this problem, it is therefore the first object of the present invention to provide a communication path construction apparatus and an N-tree construction method to provide good perceived AV quality while assuring fair bandwidth allocation in ALM. In addition, it is a second object of the present invention to complete N-tree calculation in a practical period of time.

Solution to Problem

The communication path construction apparatus according to the present invention adopts a configuration to include: a forwarding table construction controller that controls a start or end of construction of a distributed optimal path table over a plurality of communication nodes; a group constructor that assigns communication nodes to source-specific groups, based on display resolution and content types of the communication nodes, and prioritizes the source-specific groups; a bandwidth estimator that estimates a bandwidth available for a logical stream between the communication nodes; and a forwarding table constructor that constructs the distributed optimal path table, based on priorities of the source-specific groups.

The N-tree construction method according to the present invention includes: assigning communication nodes to source-specific groups, based on display resolution and content types of the communication nodes and prioritizing the source-specific groups; estimating a bandwidth available for a logical stream between the communication nodes; and constructing a distributed optimal path table over a plurality of communication nodes, based on priorities of the specific-source groups.

Advantageous Effects of Invention

The communication path construction apparatus and the N-tree construction method according to the present invention are able to provide good perceived AV quality while assuring fair bandwidth allocation in ALM. In addition, it is possible to complete N-tree calculation in a practical period of time by calculating N-tree in a distributed manner.

BRIEF DESCRIPTION OF DRAWINGS

FIG. 4 is a drawing showing a table format of a group table;

FIG. 5 is a drawing showing a table format of a stream table;

FIG. 6 is a drawing showing a table format of a content group table;

FIG. 7 is a drawing showing a table format of a group priority table;

FIG. 8 is a drawing showing a table format of an individual transmission source logical stream holding table;

FIG. 9 is a drawing showing a table format of an estimated bandwidth table;

FIG. 10 is a drawing showing a table format of a distributed optimal path table;

DESCRIPTION OF EMBODIMENTS

Figure 1:
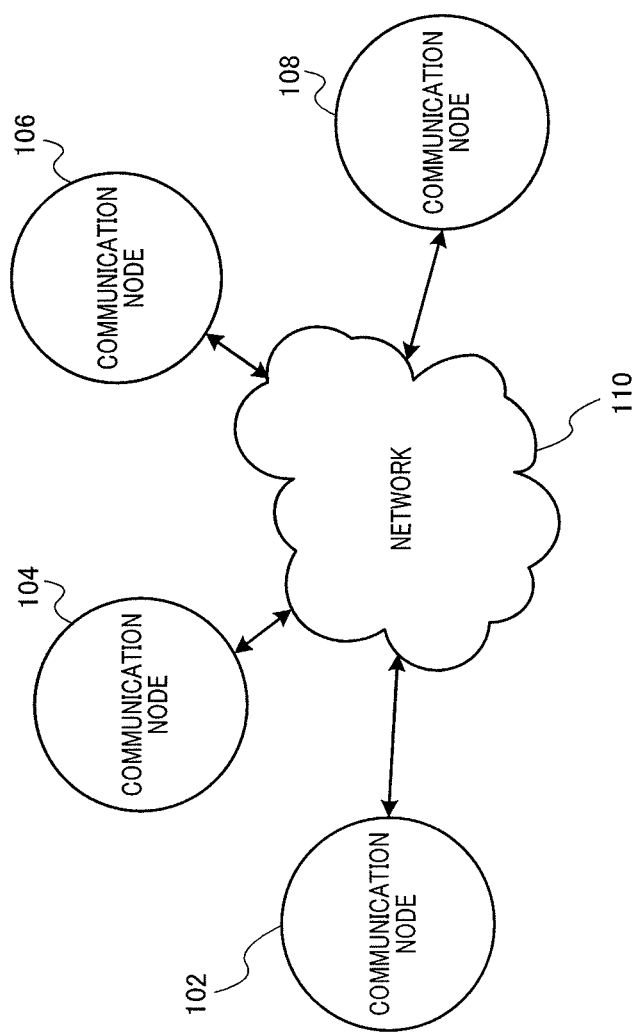
FIG. 1 is a drawing showing a simple network having a plurality of communication nodes in ALM session.

Now, embodiments of the present invention will be described in detail with reference to the accompanying drawings.

In the present invention, in addition to "water-spread policy" described in Japanese Patent Application No. 2008-029771 which has been filed by the present inventors, "viscosity," represented as display resolution and content type, is taken into consideration in N-tree construction.

Here, "water-spread policy" is an algorithm to satisfy fair bandwidth tree. Now, a summary of "water-spread policy" will be explained.

According to "water-spread policy", a vessel having N water source tunnels (holes) spreads water from its position to different positions, based on the sizes and heights of these tunnels (pressure: corresponding to an experience database used at branch selection). A large tunnel spreads more water than a small tunnel. A tunnel nearer the bottom of the vessel spreads water farther than a tunnel in a higher position. The capacity (hole size: equivalent to the bandwidth) of each tunnel may vary. This is concluded that a node having a wider bandwidth carries more streams to a number of nodes in an N-tree than a node having a narrower bandwidth.

The N-tree algorithm according to "water-spread policy" has following main phases.

i) Connection establishing phase: connection between each node is established and network metrics (node connection states) are collected.

Here, the above metric information is not represented by discrete quantities (0 or 1) indicating connection or disconnection, but is the connection state of continuous quantities reflecting full-mesh (A-B, A-C, B-C, B-A, C-A and C-B) measurement values. That is, metrics for nodes A to C may be 1 Mbps, 0.1 Mbps and 0 Mbps.

ii) N-tree construction phase: the status of N-tree having mesh node connectivity is updated using a connection table called "optimal path table" The status of node connection and disconnection is updated in an ALM session.

iii) Control or N-tree optimization phase: improvement steps are performed to progressively improve fair bandwidth allocation for the entire N-tree with minimum delay. Then, in order to optimize an N-tree, nodes or links are moved among them. This allows ALM to have fast route convergence (FRC). This information is used to construct AV stream distribution paths for nodes.

The N-tree algorithm is suitable for AV conference applications to exchange AV streams or contents among a small number of participants using an advanced dialog function and good AV quality through a session in which all members on the network participate.

To assure bandwidth fairness for all nodes, the N-tree algorithm takes into account the capacities of upload slots and download slots for each node. Here, upload slots and download slots indicate the bandwidth capacities of the uplink and the down link of each node, respectively. A bandwidth is divided into a plurality of discrete ranges such as 64 kb and 128 kb.

"Water-spread policy" is adopted with three main phases of the above-described N-tree construction algorithm to construct a fair bandwidth distribution tree. This solution allows ALM_FRC applied to all the nodes on a network participating in a specific session.

"Water-spread policy" can minimize traffic congestion by reducing end-to-end node delay. In addition, "water-spread policy" can maximize the bandwidth available between shared N-tree ALM nodes.

Moreover, a path selection mechanism according to "water-spread policy" is based on only the available bandwidth and delay in participating nodes each having evenly distributed bandwidth. Now, a case will be described where, when two or more data streams compete for an intra-link bandwidth in a shared network path, the optimal perceived AV quality is provided for participating nodes.

In a multi-party ALM video conferencing session, each participant may configure and customize its own continuous presence layout. Current solutions provide various continuous presence layouts, such as "display with an equal display resolution for all participants," "display with a lower display resolution (e.g. CIF) for non-active speakers" and "display with a higher display resolution (e.g. HD720p, HD1080i, 4CIF) for active speakers."

In addition, various content types such as audio, video, mix of audio and video, and document data may be delivered to different participating nodes through different network paths, in a single streaming session.

The present inventors considered "viscosity" that is represented as display resolution and content type in N-tree construction, as well as the above-described "water-spread policy." By this means, it is possible to provide the best perceived AV quality according to the available bandwidth and endpoint capabilities.

In addition, according to the present invention, the N-tree algorithm is able to be executed among nodes in a distributed manner, so that it is possible to distribute N-tree construction processing among a plurality of nodes, and therefore prevent only a specific node from being loaded.

Next, definitions of the terms used in the present embodiment will be described to ensure clarity and consistency of this technique.

1. "ALM session" is defined as a logical session in which two or more communication nodes are connected over a network in a multi-party application to simultaneously exchange data packets among them.

2. "Viscosity" defines conditions or states of different types of liquids to be transported between two or more different points where they may share the same path to travel in "water-spread policy." Liquids with different viscosities may travel on a flat surface at different speeds. In the present embodiment, "viscosity" refers to the display resolution and content type of an AV stream.

3. "Stream originating node" denotes a communication node to deliver contents captured by a capturing device. "Stream originating node" is also used interchangeably with "source" or "source node."

4. "Stream relay node" denotes a communication node to receive content from a stream originating node and relay it to the next communication node.

5. "Stream receiving node" denotes a communication node to receive content and play it back. "Stream receiving node" is also used interchangeably with "receiver" or "receiver node."

6. "Stream coordinating node" denotes a communication node to perform synchronized tasks for all communication nodes in an ALM session.

7. "Group-based tree" is composed of a source node and a group of receiver nodes requesting the same display resolution and content type from the source node.

8. "Prioritized group-based trees" are formed by ranking a plurality of group-based trees, based on a set of pre-defined ranking rules.

9. "Logical stream" denotes a virtual path (network path) formed between two communication nodes which do not have established active connection. These communication nodes on a virtual path share a set of common attributes, and, when a logical stream having common attributes is eventually selected, establish active connection. A common attribute is, for example, the same display resolution and content type requested from the same streaming session or the same originating node, and has a bandwidth and so forth available for content transmission between two communication nodes.

10. "Forwarding table" is formed by packet forwarding information used by communication nodes to forward a received packet to the subsequent communication node designated by the forwarding table until arrival at the destination.

FIG. 1 is a drawing showing a communication system according to an embodiment of the present invention. As shown in FIG. 1, a plurality of communication nodes 102, 104, 106, 108 are connected to the same network 110 enabling connection among them. Communication nodes are able to exchange AV streams and control streams simultaneously between them during an ALM session. A stream coordinating node, a stream originating node, a stream relay node and a stream receiving node can be logical entities which simultaneously reside in one communication node or in a plurality of communication nodes.

Here, in the present invention, "node" and "entity" that are terms denoting physical and logical entities may be used interchangeably with one another.

Figure 2:
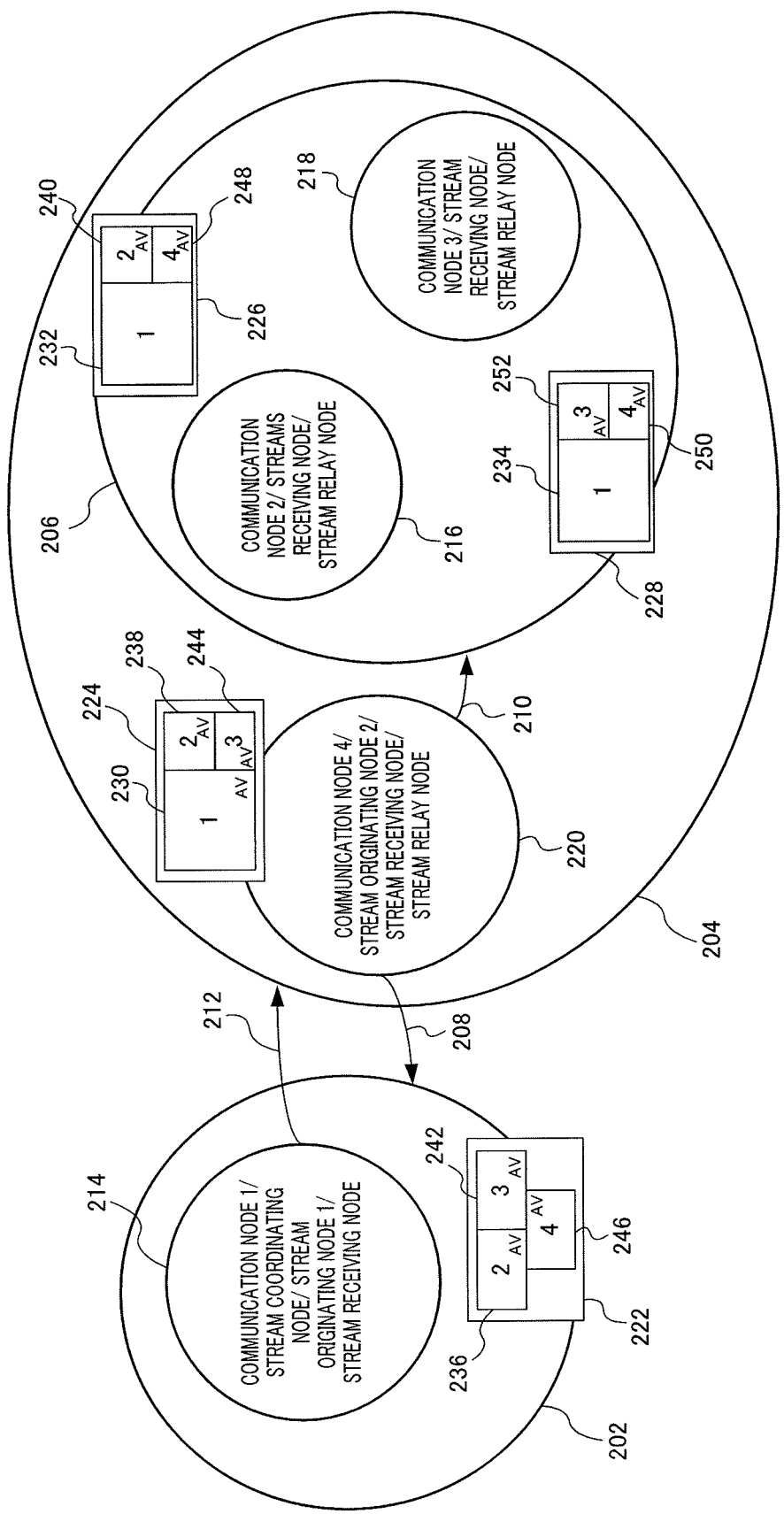
FIG. 2 is a drawing showing an example of a plurality of comunication node groups based on different display resolution and content types.

FIG. 2 is another drawing showing the communication system according to an embodiment of the present invention. FIG. 2 shows an example in which a plurality of communication nodes act as stream receiving nodes, stream originating nodes, a stream coordinating node and stream relay nodes under different communication node groups.

Grouping of communication nodes is performed based on display resolution and content types requested from specific stream originating nodes. Stream receiving nodes may request different display resolutions (e.g. HD720p, 4CIF, CIF) and content types from a stream originating node. Here, content types include, for example, audio only (A), video only (V), mix of audio and video (AV), document data (D) and control data (C).

Each display resolution and content type request forms a communication node group (hereinafter "source-specific display resolution/content type group" or "source-specific group") for further group-based tree construction.

Group 204 shows a communication node group formed by communication nodes requesting the same display resolution (HD720p) and content type (mix of audio and video) 230, 232, 234 from communication node #1. Group 202 and group 206 show different communication node groups, formed by communication nodes #2, #3 and #1, which request different display resolution and content types from communication node #4.

That is, group 202 is a communication node group which requests 4CIF display resolution and audio and video-mixed content type 246 from communication node #4. Meanwhile, group 206 is a communication node group which requests CIF display resolution and an audio and video-mixed content type 248, 250 from communication nodes #4.

As shown in FIG. 2, an ALM session with N participating nodes may have up to N communication nodes, which are stream receiving nodes. Stream receiving node 214, 216, 218, 220 start requesting display resolution and content types to stream originating nodes having the designated display resolution and content types, respectively.

Each stream receiving node may have different options from the display resolution and content type requested from the stream originating node. For example, communication node #1 may set videos from communication nodes #2, #3 and #4 to be displayed in 4CIF resolution 236, 242, 246. Communication nodes #2 #3 and #4 may set videos from communication node #1 to be displayed in high definition resolution 230, 232, 234. Here, communication nodes #2, #3 and #4 may set videos from other communication nodes to be displayed in CIF resolution 238, 240, 244, 248, 250, 252.

Each communication node being able to deliver multimedia content to all participating nodes contains the ALM function of a stream originating node.

FIG. 2 shows an example in which communication nodes #1 and #4 are stream originating nodes. The display resolution and content type (hereinafter "viscosity information") requested from each of stream receiving nodes 214, 216, 218 are retained only in stream originating nodes 214, 220. In each stream originating node, based on the requested display resolution and content type, stream receiving nodes are further divided into a plurality of source-specific display resolution/content type groups 202, 204, 206. To be more specific, stream originating node 214 constitute display resolution/content type group 204. That is, in display resolution/content type group 204, the groups constructed to distribute streams from stream originating node 214 with display resolution/content type 230, 232, 234 are retained. Likewise, elements in the stream originating node 220 are retained in display resolution/content type groups 202, 206. That is, display resolution/content type group 202 is a group to display streams from stream originating node 220 with display resolution/content type 246. Display resolution/content type group 206 is a group to display streams from stream originating node 220 with display resolution/content types 248, 250.

A group-based tree is constructed for each of these groups 202, 204, 206. For example, for communication node #4, which is a stream originating node, two group-based trees are constructed. That is, in communication node #4, a group-based tree for transmitting 4CIF AV content to communication node #1 and a group-based tree for transmitting CIF AV content to communication nodes #2 and #3. In communication node #1, a group-based tree for communication nodes #2, #3 and #4 is constructed to transmit high definition AV content.

According to requested content types, communication node #1 is able to form more than one group-based trees. For example, in communication node #1, more than one group-based trees may be formed to separately deliver 4CIF video and audio content to communication nodes #2, #3 and #4 via different paths.

Here, at least one communication node will be a stream coordinating node for session coordination among participating nodes. FIG. 2 shows an example in which communication node #1 is a stream coordinating node. The stream coordinating node receives a request list of display resolution/content type groups 202, 204, 206 from all stream originating nodes 214, 220 during a session.

Stream coordinating node (214) defines a weight relative to each display resolution and content type, according to the priorities of the display resolution and content types based on the preference set by the user or application. Moreover, streaming coordinating node 214 ranks the received list of display resolution/content type groups 202, 204, 206 and defines the priorities of the groups. The priority of groups used later when the priority of group-based tree construction is determined.

Each node in the same display resolution/content type group is eligible to be a stream relay node. For example, in group 204, communication nodes 216, 218, 220 request the same content from communication node 214. This content may be relayed from the node that first received the content to the next node. In order to select network paths in a group, each stream relay node performs bandwidth estimation to estimate (assess) the maximum bandwidth required to deliver this display resolution and content type by each logical stream.

Note that each of communication nodes 214, 216, 218, 220 is eligible to be a stream originating node and a stream relay node for a plurality of source-specific display resolution/content type groups at the same time. Thus, these communication nodes may be involved in at least N display resolution/content type groups during an ALM session with N participating nodes.

Meanwhile, these communication nodes have only a limited bandwidth shared to transmit a plurality of streams. Accordingly, bandwidth estimation allows bandwidth distribution to logical streams formed by these communication nodes themselves as stream relay nodes or stream originating nodes in a plurality of groups. This bandwidth estimation is performed in these communication nodes 214, 216, 218, 220.

A fair bandwidth allocation and distribution mechanism compares the logical stream from a display resolution/content type group with a higher priority to the logical stream from a display resolution/content type group with a lower priority. Next, the fair bandwidth allocation and distribution mechanism is applied to allocate a shared bandwidth at a higher rate. By this means, fairness of perceived AV quality, which is optimized between streams, is achieved for a display resolution/content type with a higher priority.

In earlier stages, each stream originating node sequentially commands to construct group-based trees, based on the priority of a group defined by a stream coordinating node. In each group, stream receiving nodes select the logical stream having the maximum estimated bandwidth, to form a network path. The logical stream having the maximum estimated bandwidth denotes a network path having a bandwidth to allow stream receiving nodes to receive the best perceived AV quality.

The selection result is reflected in the logical stream relaying node to update a forwarding table. The forwarding table information is used by a stream originating node and the subsequent relay node to forward a received AV packet to the subsequent stream receiving node until arrival at the final destination. The consecutive group-based tree construction from one group to another group ensures accuracy of bandwidth estimation for prioritized display resolution/contents types in network 110. In addition, concurrent group-based tree construction is also possible with a synchronization mechanism placed in an appropriate location to synchronize and obtain remaining bandwidth information among groups.

Figure 3:
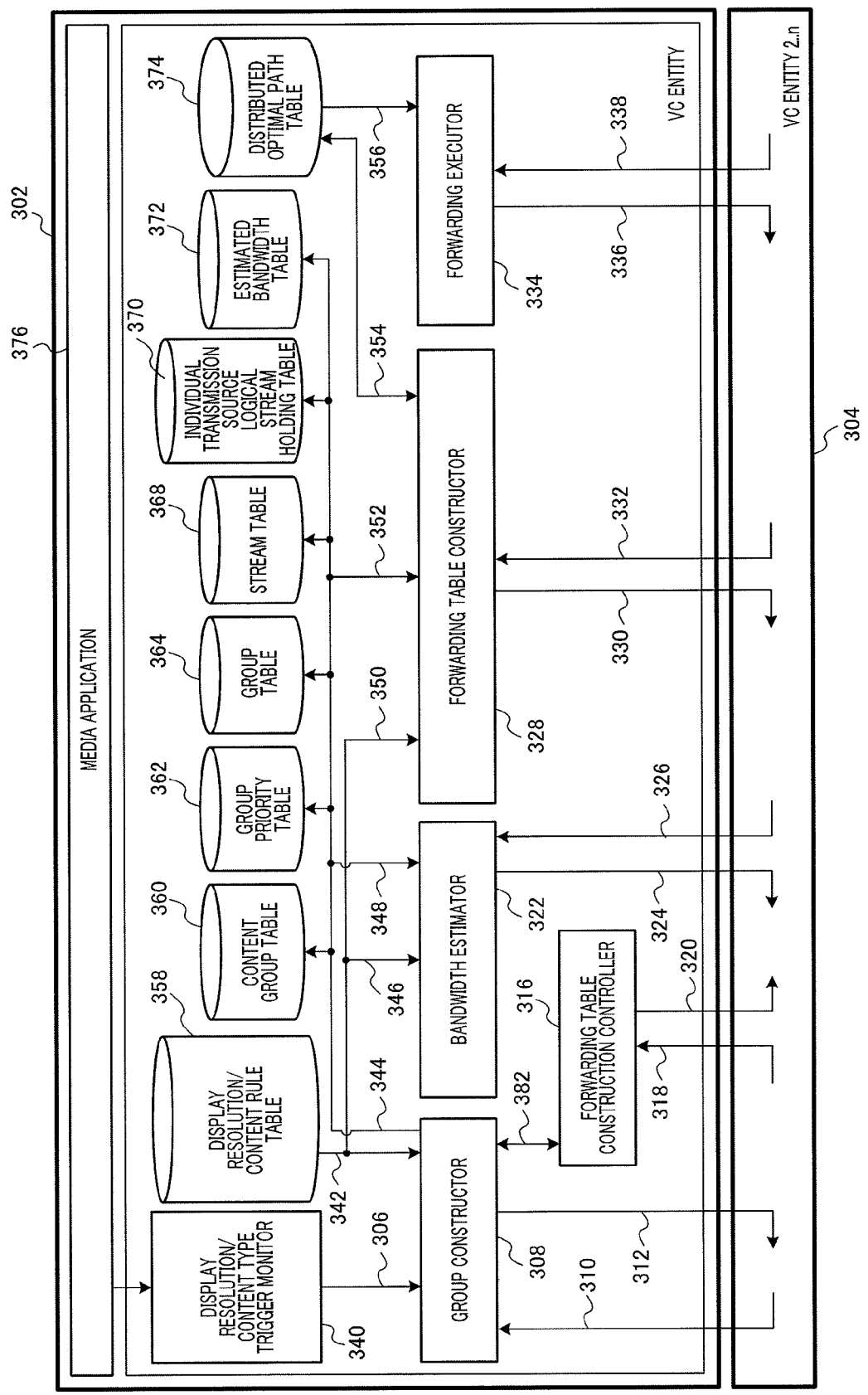
FIG. 3 is a drawing showing an example of primary parts of a communication path construction apparatus in a communication node in a network environment.

FIG. 3 is a block diagram illustrating internal configuration 302, 304 of a communication node in a network environment according to an embodiment of the present invention. Each communication node has group constructor 308, forwarding table construction controller 316, bandwidth estimator 322, forwarding table constructor 328 and forwarding executor 334.

These five modules 308, 316, 322, 328, 334 are connected via a plurality of tables 358 to 374 in order to exchange information among them. These tables are display resolution/content rule table 358, content group table 360, group priority table 362, group table 364, stream table 368, individual transmission source logical stream holding table 370, estimated bandwidth table 372 and distributed optimal path table (OPT) 374.

Display resolution/content type trigger monitor 340 determines whether or not there is a request to change a display resolution/content type reported from media application 376.

Forwarding table construction controller 316 controls distributed optimal path table construction for the plurality of communication nodes 302, 304. Distributed OPT 374 formed by forwarding information resulting from group-based tree construction. The optimal network path is constructed based on the priority of group-based trees in a distributed manner. Therefore, if a request to change display resolution and content types 230 to 252 is invoked by any participating node before all group-based trees are constructed, the accuracy of ALM path construction may be influenced.

In the above case, the latest requested display resolution and content type may cause unfair bandwidth allocation. Therefore, forwarding table construction controller 316 exists to synchronously construct distributed optimal path tables. That is, forwarding table construction controller 316 reports the start and the end of distributed optimal path table construction events 318, 320, 382, to all participating nodes. This allows the participating nodes to perform control change, so that it is possible to synchronously construct distributed optimal path tables.

Group constructor 308 allocates (assigns) communication nodes to source-specific groups, based on display resolution/content types. Media application 376 controlled by the user commands to change a requested display resolution/content type. Group constructor 308 for each stream receiving node receives (306) a display resolution/content type change request from display resolution/content type trigger monitor 340. Next, group constructor 308 for each stream receiving node reports (310, 312) the requested display resolution/content type to group constructor 308 for each stream originating node.

Group constructor 308 of a stream originating node classifies stream receiving nodes into a plurality of source-specific display resolution/content type groups, based on requested display resolution/content types. Note that classification is performed according to display resolution/content type rules (342). Group constructor 308 of a stream originating node reports (310) connection information of stream receiving nodes in source-specific display resolution/content type groups to stream table 368.

Group table 364 in which group information is recorded (344) is maintained in stream originating nodes and stream receiving nodes. FIG. 4 shows an example of the format of group table 364.

As shown in FIG. 4, group table 364 includes group ID 2002 denoting a unique identifier for this group, group priority 2004 indicating the priority of this group relative to other groups existing in an ALM session, content group ID 2006 indicating an exchanged display resolution and content type, receiver ID 2008 indicating a stream receiving node that requests the display resolution and content type provided by the group, and stream ID 2010 representing a list of logical streams that is created among stream receiving nodes in the group (which may be the network paths to deliver specific display resolution and content types).

Stream table 368 in which logical stream information and connection information are recorded, is maintained by group constructor 308. FIG. 5 shows an example of the format of stream table 368. As shown in FIG. 5, stream table 368 is composed of stream ID 2102, sender ID 2104, receiver ID 2106 and connection information 2108 including IP address and port information.

Group constructor 308 in a stream coordinating node forms groups, based on display resolution/content types, and assigns a weight to each group, upon receiving (310) information from all stream originating nodes.

Group constructor 308 arranges source-specific display resolution/content type groups into an ordering list and reports the priorities of the source-specific display resolution/content type groups to all stream originating nodes.

Content group table 360 to refer to weight information for bandwidth estimation is maintained (344) in all participating nodes. FIG. 6 shows an example of the format of content group table 360.

As shown in FIG. 6, content group table 360 is composed of content group ID 2202, which is a unique identifier to a specific display resolution/content type, display resolution 2204 of content group, content type 2206 delivered by the content group and weight information 2208 indicating the priority of the content delivered by the content group relative to other contents during an ALM session.

Group priority table 362 is maintained by group constructor 308 in each stream originating node. The priority of group-based tree construction is based on the priority assigned in this table. FIG. 7 shows an example of the format of group priority table 362. As shown in FIG. 7, group priority table 362 is composed of group ID 2302 and priority information 2304.

Bandwidth estimator 322 estimates (assesses) the bandwidth available for all logical paths. Bandwidth estimator 322 in a stream relay node refers (348) participating nodes in the same source-specific display resolution and content type group and constructs logical paths for all participating nodes. Bandwidth estimator 322 estimates 346 the bandwidth allocated for each logical stream, based on the display resolution/content type rules.

In addition, bandwidth estimator 322 reports 326 information of the estimated bandwidth for subsequent selection, to bandwidth estimator 322 in a stream receiving node. Upon receiving (324) the estimated bandwidth information, bandwidth estimator 322 in the stream receiving node updates estimated bandwidth table 372.

Individual transmission source logical stream holding table 370 is maintained in each stream relay node in which logical stream information about the stream relay node is recorded. FIG. 8 shows an example of the format of individual transmission source logical stream holding table 370. As shown in FIG. 8, individual transmission source logical stream holding table 370 is composed of sender ID 2402, receiver ID 2404, estimated link bandwidth 2406 and stream ID 2408. Sender ID 2402 is a unique identifier for a specific stream relay node.

Receiver ID 2404 denotes the stream receiving node having at least one logical stream connected to a stream relay node. Estimated link bandwidth 2406 denotes the maximum estimated bandwidth available from the stream relay node to the specific stream receiving node. Stream ID 2408 includes a list of logical streams formed under the connection between the specific stream relay node and the stream receiving node.

Estimated bandwidth table 372 is maintained by both a stream relay node and a stream receiving node. By this means, estimated bandwidth information in a stream relay node is transmitted to a stream receiving node for logical stream selection. FIG. 9 shows the format of an estimated bandwidth table. As shown in FIG. 9, an estimated bandwidth table is composed of stream ID 2502 and estimated bandwidth 2504 information for a specific logical stream.

Forwarding table constructor 328 constructs distributed OPT 374, based on source-specific display resolution/content type groups. Forwarding table constructor 328 in stream originating node refers (352) to the group priority and starts group-based tree construction. Forwarding table constructor 328 in stream receiving node selects (350) the logical stream having the maximum estimated bandwidth, based on the display resolution/content type rules.

In addition, forwarding table constructor 328 reports (330) the logical stream selection result to forwarding table constructor 328 in a stream relay node having an estimated (332) bandwidth. Forwarding table constructor 328 in the stream relay node updates (354) distributed OPT 374.

FIG. 10 shows an example of the format of distributed OPT 374. Each distributed OPT 374 includes group ID 2602, path ID 2604, selected stream ID 2606 and actual allocated bandwidth 2608. Group ID 2602 is a unique identifier for a source-specific display resolution/content type group.

Path ID 2604 represents branching of paths originated from the same source in a group-based tree. Selected stream ID 2606 indicates a list of logical streams selected with respect to each path ID. Actual allocated bandwidth 2608 denotes the final bandwidth allocated for content transmission in paths.

Forwarding executor 334 uses distributed OPT 374 for content transmission. Upon receiving (338) content from another communication node, forwarding executor 334 performs lookup (356) on the OPT. Based on the lookup result from the OPT, forwarding executor 334 identifies the next designated destination and relays (336) the content.

Display resolution/content rule table 358 contains a set of heuristic rules used (342, 346, 350) to construct distributed OPT 374. Now, part of the basic and expanded rules will be described.

Rule 1: A group-based tree is constructed for each specific display resolution/content type requested from a stream originating node for packet distribution in a display resolution/content type-based network.

Rule 2: A stream originating node having M formed groups transmits M display resolution/content type-specific streams to each group.

Rule 3: Each group composed of N stream receiving nodes constructs (N-1) links in the group.

Rule 4: Changing display resolution and content types is allowed only when a change control flag (status) is "turned on" to accept a change request.

Rule 5: Forwarding paths updated based on the latest constructed group-based tree is referred only when the latest group-based tree is constructed according to a group-based reconstruction session.

Rule 6: The bandwidth for each logical stream delivered by a stream relay node is calculated based on the display resolution/content type delivered on the stream.

Rule 7: The logical stream with the maximum estimated bandwidth shall be preferentially selected. Here, this rule may be reconfigured based on the user or application preference.

Rule 8: The group priority shall be decided based on display resolution and content types replaced such that a group delivering content with a higher display resolution and a higher data rate has a higher priority. Here, this rule may be reconfigured based on the user or application preference.

Rule 9: Source-specific display resolution/content type groups are ranked according to following rules.

(1) Rank the groups in ascending order starting from a group which transmits a display resolution and content type of a lower priority;

(2) Rank the groups to deliver the same display resolution and content type in ascending order starting from a group having a smaller number of stream receiving nodes;

(3) Rank the groups having the same number of stream receiving nodes in ascending order of their bandwidths available for content transmission from the stream originating node. Here, this rule may be reconfigured based on the user or application preference.

Figure 11:
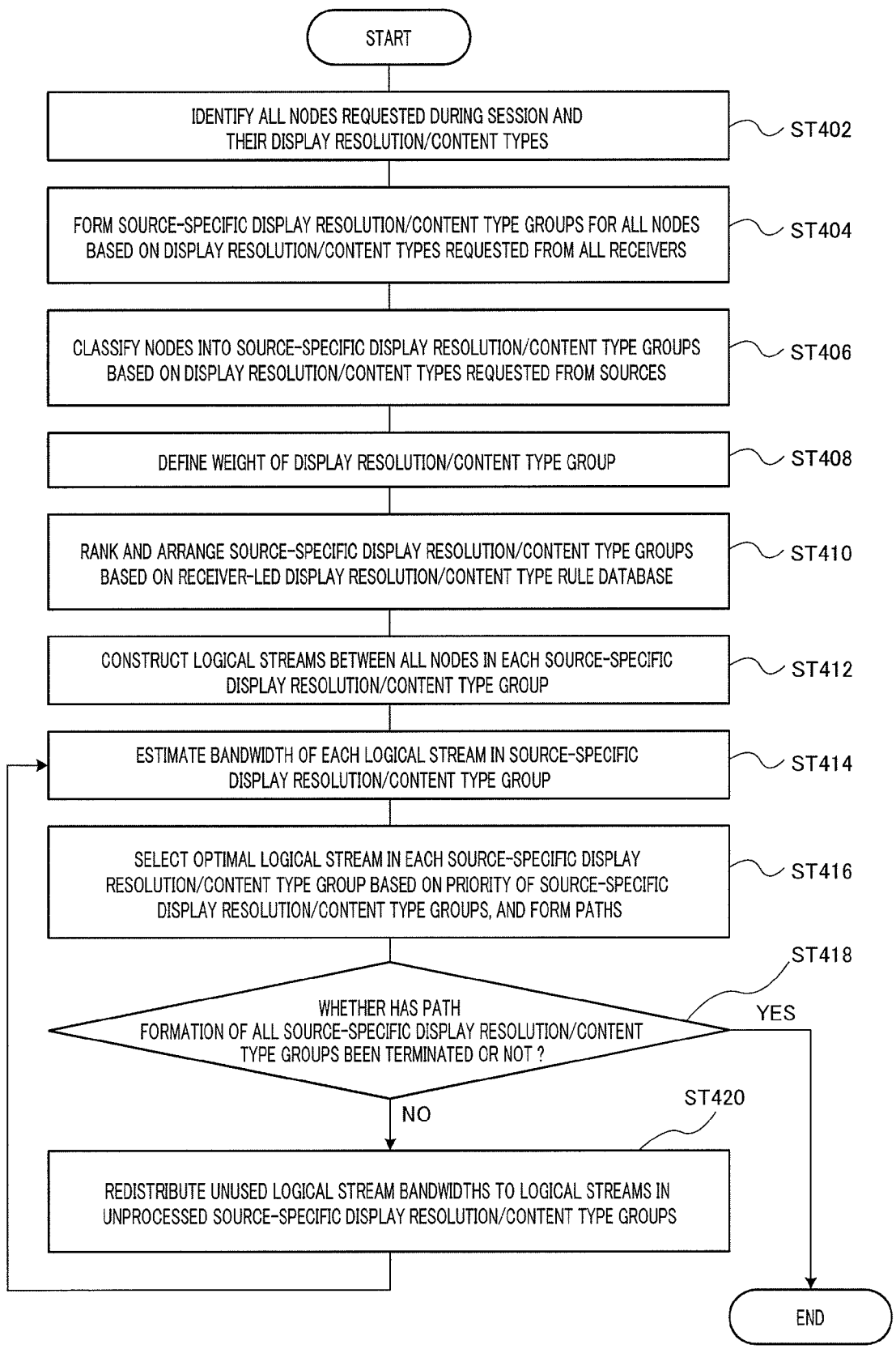
FIG. 11 illustrates a main process flow of group-based tree construction for identification of fair bandwidth allocation to allow optimal perceived AV quality.
Figure 12:
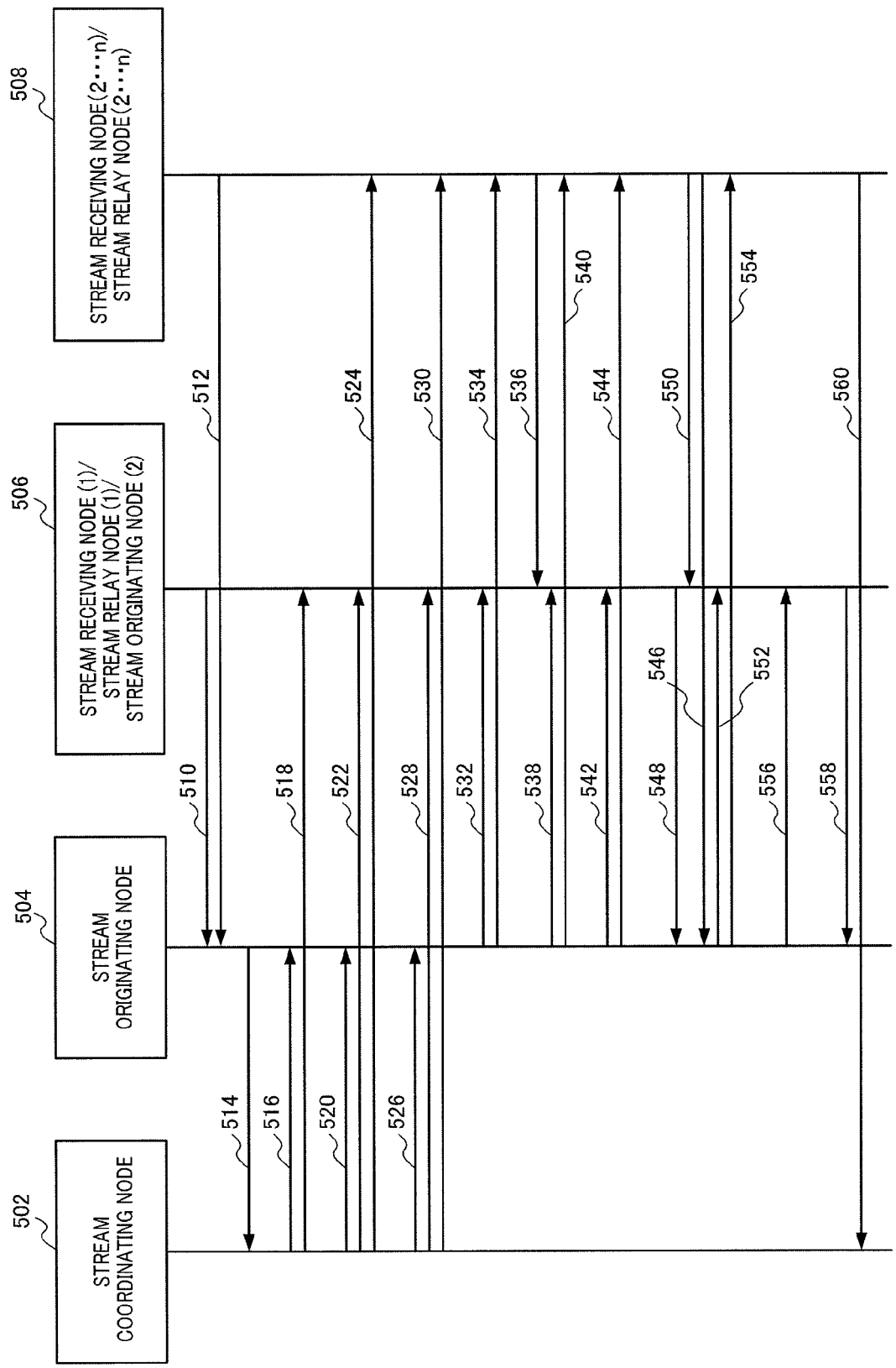
FIG. 12 illustrates a message exchange sequence through stream originating nodes, stream receiving nodes, stream relay nodes and a stream coordinating node.

FIG. 11 illustrates the main process flow of group-based tree construction used for fair bandwidth allocation to achieve the optimized perceived AV quality. FIG. 12 shows message exchange sequences among stream originating nodes, stream receiving nodes, stream relay nodes and a stream coordinating node to realize the process shown in FIG. 11.

As shown in FIG. 12, necessary information is exchanged among stream originating nodes 504, 506, stream receiving nodes 506, 508, stream relay nodes 506, 508 and stream coordinating node 502. Therefore, various communication messages are defined as described below.

(1) Display resolution/content type reporting messages 510, 512;
(2) Source-specific display resolution/content type reporting message 514;
(3) Distributed optimal path table construction status messages 516, 518;
(4) Weight reporting messages 520, 522, 524;
(5) Group priority reporting messages 526, 528, 530;
(6) Source-specific group list reporting messages 532, 534;
(7) Estimated bandwidth reporting messages 536, 538, 540;
(8) Group-based tree construction invoking selection messages 542, 544;
(9) Group-based tree construction stream selection messages 546, 548, 550, 552, 554; and
(10) Group-based tree construction message 556.

Figure 13:
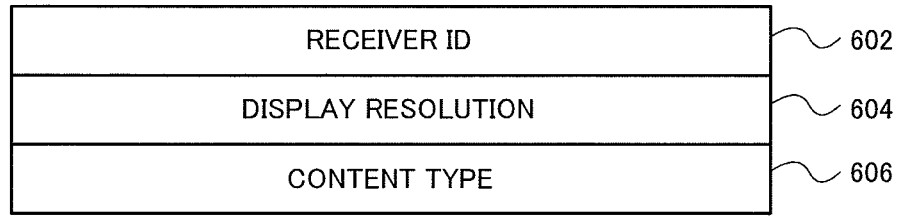
FIG. 13 is a drawing showing a format of a display resolution/content type reporting message.

FIG. 13 shows an example of the format of display resolution/content type reporting messages 510, 512. As shown in FIG. 13, the above-described messages 510, 512 each has receiver ID 602 which is a unique identifier for stream receiving node, display resolution 604 and content type 606 in a communication node.

Figure 14:
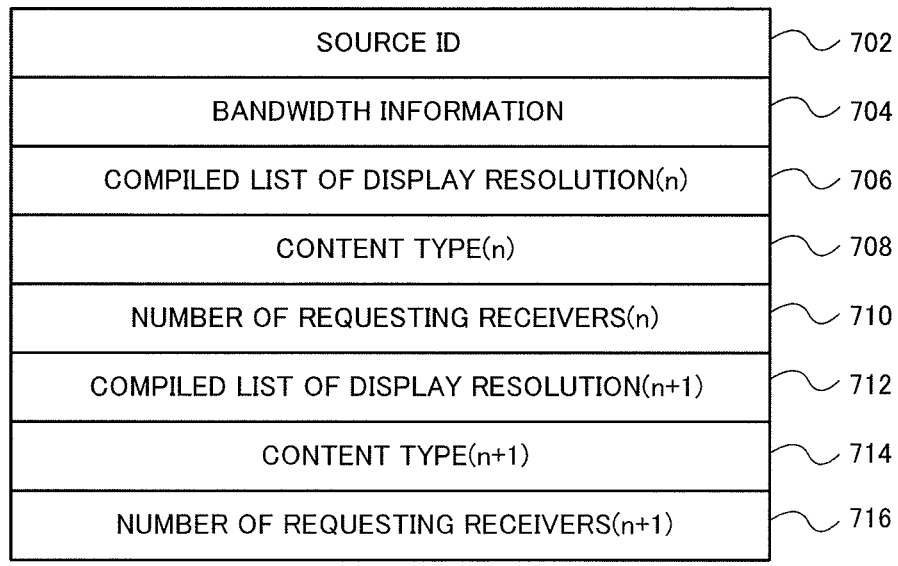
FIG. 14 is a drawing showing a format of a source-specific display resolution/content type reporting message.

FIG. 14 shows an example of the format of source-specific display resolution/content type reporting message 514. As shown in FIG. 14, the above-described message 514 is composed of source ID 702 which is the unique identifier for a stream originating node; bandwidth information 704 indicating the entire bandwidth available for a stream originating node to exchange data during an ALM session, compiled lists of display resolutions 706, 712, content types 708, 714, and the number of stream receiving nodes 710, 716 requesting display resolution/content types.

Figure 15:
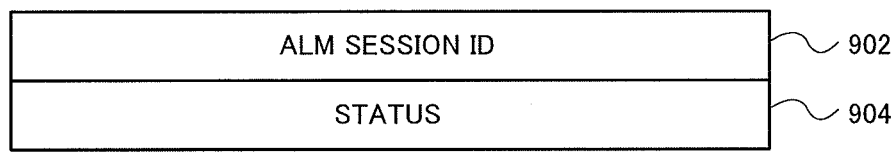
FIG. 15 is a drawing showing a format of a distributed optimal path table construction status message.

FIG. 15 shows an example of the format of distributed optimal path table construction status messages 516, 518. As shown in FIG. 15, the above-described messages 516, 518 are each composed of ALM session ID 902 and status 904. An additional request to change a display resolution/content type is not allowed when status 904 is set to "change-off," but allowed when status 904 is set to "change-on."

Figure 16:
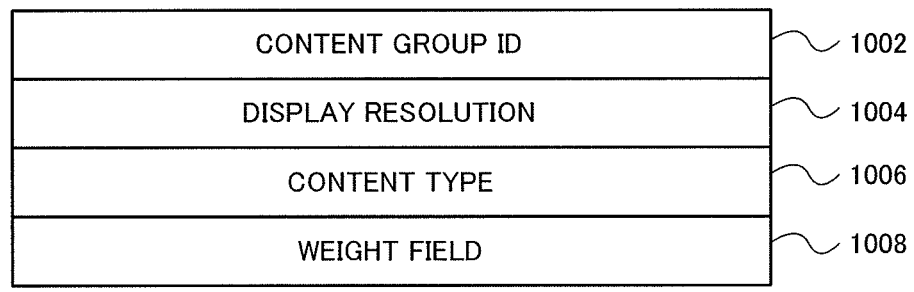
FIG. 16 is a drawing showing a format of a weight reporting message.

FIG. 16 shows an example of the format of weight reporting messages 520, 522, 524. As shown in FIG. 16, the above-described messages 520, 522, 524 are each composed of content group ID 1002, a display resolution 1004, content type 1006 and weight field 1008.

Content group ID 1002 indicates the unique identifier for a specific display resolution/content type group. Display resolution 1004 represents the display resolution of the group. Content type 1006 represents the content type of the group. Weight field 1008 indicates the priority of this specific content group over other content groups.

Figure 17:
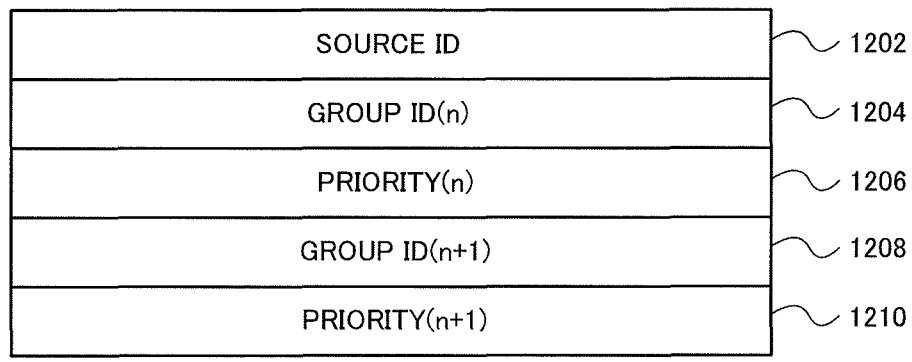
FIG. 17 is a drawing showing a format of a group priority reporting message.

FIG. 17 defines the message structure of the group priority reporting messages 526, 528, 530. As shown in FIG. 17, the above-described messages 526, 528, 530 are each composed of source ID 1202, group IDs 1204, 1208 and priorities 1206, 1210. Source ID 1202 denotes the unique identifier for a stream originating node. Group IDs 1204, 1208 each denote a source-specific display resolution/content type group. Priorities 1206, 1210 each indicate the order of group-based tree construction for the above-described groups.

Figure 18:
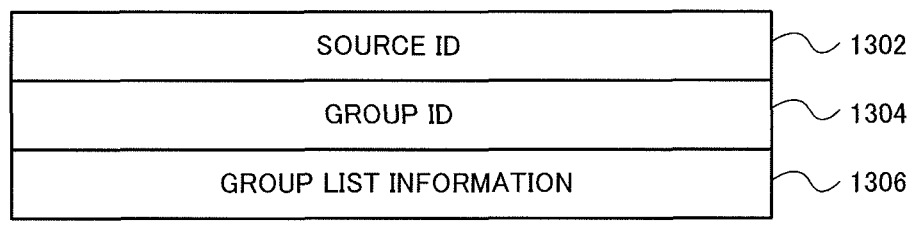
FIG. 18 is a drawing showing a format of a source-specific group list reporting message.

FIG. 18 defines the message structure of source-specific group list reporting messages 532, 534. As shown in FIG. 18, the above-described messages 532, 534 are each composed of source ID 1302, group ID 1304 and group list information 1306 including receiver IDs. In addition, connection information includes IP address and port information used in packet delivery by copying and relaying packets between terminals.

Figure 19:
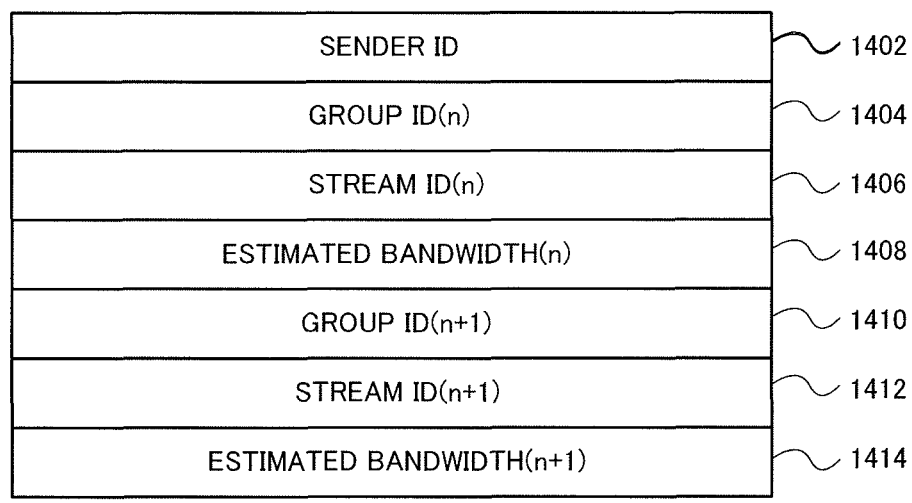
FIG. 19 is a drawing showing a format of an estimated bandwidth reporting message.

FIG. 19 shows an example of the format of estimated bandwidth reporting messages 536, 538, 540. As shown in FIG. 19, the above-described messages 536, 538, 540 are each composed of sender ID 1402 which is a unique identifier for a specific stream originating node or stream relay node; group IDs 1404, 1410 each indicating the group to which the logical stream belongs; stream IDs 1406, 1412 each of which is a unique identifier for a specific logical stream; and estimated bandwidths 1408, 1414 each indicating the maximum bandwidth available for content delivery.

Figure 20:
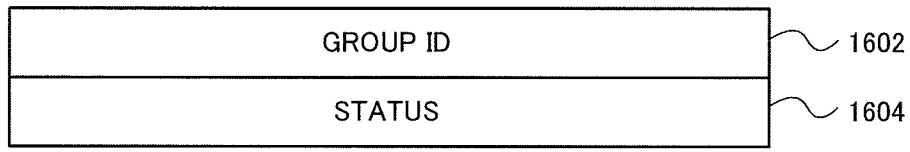
FIG. 20 is a drawing showing a format of a group-based tree construction invoking selection message.

FIG. 20 shows an example of the format of group-based tree invoking selection messages 542, 544. As shown in FIG. 20, the above-described messages 542, 544 are each composed of group ID 1602 and status 1604 indicating conditions to indicate "start"/"end"/"halt" states of group-based tree construction.

Figure 21:
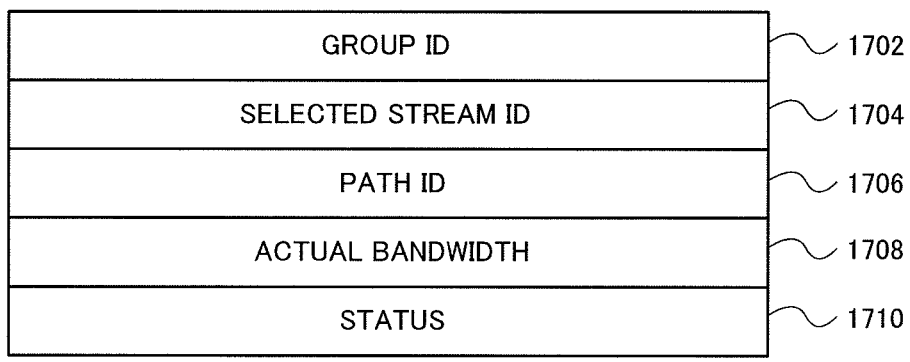
FIG. 21 is a drawing showing a format of a group-based tree construction stream selection message.

FIG. 21 is an example of the format of group-based tree construction stream selection messages 546, 548, 550, 552, 554. As shown in FIG. 21, the above-described messages 546, 548, 550, 552, 554 are each composed of group ID 1702, selection stream ID 1704, path ID 1706, actual bandwidth 1708 indicating the bandwidth allocated to deliver AV content and so forth, and status 1710 indicating "selection"/"removal"/"reselection", which are operations of group-based tree construction.

Figure 22:
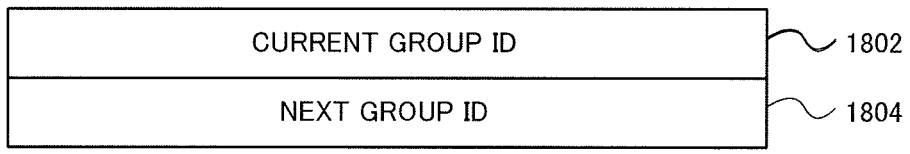
FIG. 22 is a drawing showing a format of a group-based tree construction message.

FIG. 22 shows an example of the format of group-based tree construction message 556. As shown in FIG. 22, the above-described message 556 is composed of current group ID 1802 and next group ID 1804. Current group ID 1802 indicates the source-specific display resolution/content type group which has built a group-based tree. Next group ID 1804 indicates the next source-specific display resolution/content type group which may build a group-based tree.

Now, the main process shown in FIG. 11 and the process shown in FIG. 12 will be described in detail, with reference to FIG. 23, FIG. 24, FIG. 27 and FIG. 28.

First, a display resolution/content type requested from each stream receiving node is reported via a display resolution/content type reporting message. To be more specific, each of the stream receiving nodes 506, 508 reports display resolution/content type reporting messages 510, 512 to specific stream originating node 504. Upon receiving the reporting message, stream originating node 504 identifies whether or not the requested source-specific display resolution/content type group has been created (ST 402.)

When a new set of display resolution and content type is requested, a new entry of source-specific display resolution/content type group is added to the group table. On the other hand, if there is no request for a new set, the stream receiving node ID is added to existing entries in a group table formed by similar requested display resolution and content types.

By this means, the stream originating node creates a source-specified display resolution/content type group (ST 404.) All nodes are classified into source-specific display resolution/content type groups, based on their display resolution and content type (ST 406.)

Figure 23:
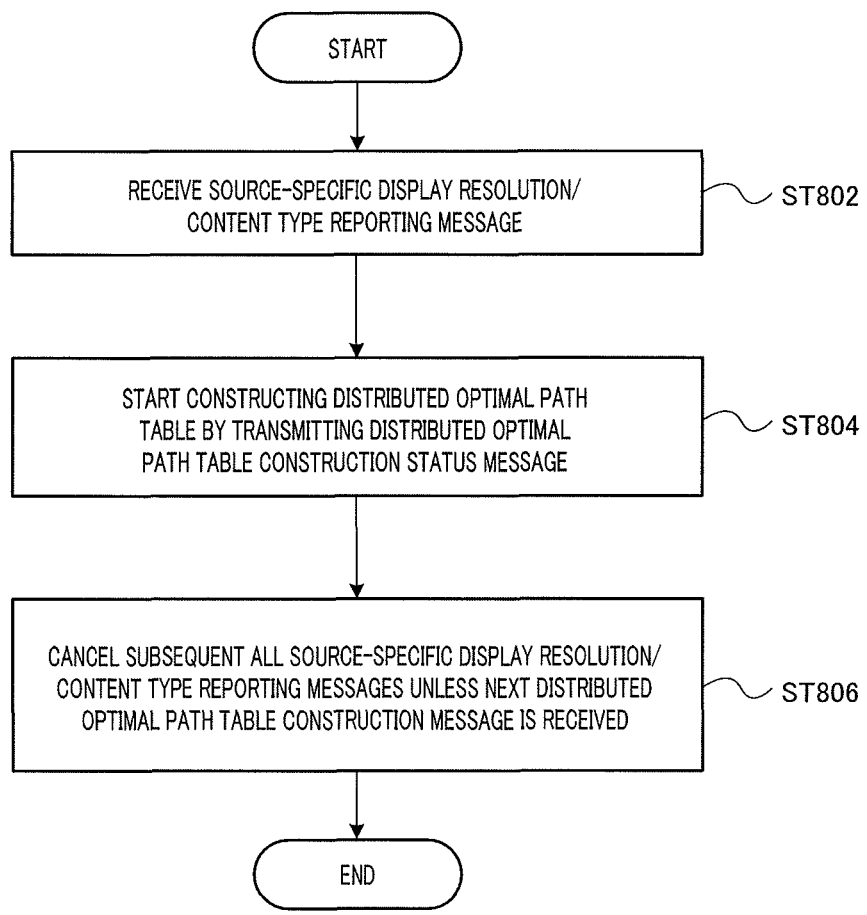
FIG. 23 is a drawing showing a detailed process flow to notify the start of distributed optimal path table construction.

FIG. 23 is a flowchart explaining operations of stream coordinating node 502 and shows a detailed process flow to notify the start of distributed optimal path table construction.

Upon receiving display resolution/content type reporting messages from all participating nodes, each stream originating node transmits source-specific display resolution/content type reporting message 514 to stream coordinating node 502. Upon receiving the source-specific display resolution/content type reporting messages from all stream originating nodes (ST 802), stream coordinating node 502 commands (516, 518) to notify the start of distributed optimal path table construction.

Distributed optimal path table construction status messages 516, 518 each composed of ALM session ID 902 set to "change-off" and status 904 are delivered to all participating nodes (ST 804.) Here, "change-off" denotes that additional request to change a display resolution and content type is not allowed. Upon transmitting these messages 516, 518, all subsequent display resolution/content type reporting messages 510, 512 are processed as follows. That is, all subsequent display resolution/content type reporting messages 510, 512 are not processed but cancelled unless subsequent distributed optimal path table construction status messages 516, 518 are received (ST 806.)

This facilitates construction of a display resolution/content type group, which is then used for bandwidth estimation in the network path. This operation avoids constructing distributed path tables at the same time based on a plurality of requests made at the same time. This assures integrity of the formed display resolution/content type group and consistency of the requested bandwidth allocation based on the display resolution and content type requested.

For example, in FIG. 2, assume that the group-based tree construction follows the sequence of building a group-based tree for group 206, group 202 and then group 204. During construction of the group-based tree for group 202, communication node #2 in group 206 is able to temporarily invoke a display resolution change from CIF to 4CIF for the content from communication node #4 in group 204.

Accepting the display resolution change request from communication node #2 during the group-based tree construction process for group 202 breaks the integrity of groups formed. That is, the group-based tree for group 206 is invalid because communication node #2 is left to connect to group 202. As a result of this, the bandwidth allocated at the time of the group-based tree construction for group 206 is invalid, which influences the accuracy of distribution of the allocated bandwidth based on the priority of a temporarily selected display resolution.

Using all collected display resolution/content type group information, stream coordinating node 502 is able to define the weight for each display resolution/content type group (ST 408.) The defined weight is then mapped to a set of priorities obtained by ordering a list of display resolution and content types (i.e. viscosities). Here, stream coordinating node 502 may adopt different rules to derive the relative weight for a display resolution/content type.

According to the present embodiment, the weight for a display resolution is defined according to the bit rate required per frame, with respect to the minimum delivered display resolution. In this case, for weight assignment, QCIF is selected as a reference for relative comparison with CIF, 4CIF, HD720p and so forth.

Meanwhile, the weight for a content type is defined according to the minimum bandwidth required for transmission with respective to the smallest content type to be delivered. In this case, for weight assignment, an audio only content type is selected as a reference for relative comparison with video only, audio and video, and document.

The weight defined for each display resolution/content type is used as a reference to derive the priority of each group delivering the specific content and then influence the bandwidth allocation for each stream. This information is further distributed to all participating nodes via weight reporting messages 520, 522, 524.

Given a list of source-specific display resolution/content type information, stream coordinating node 502 ranks and orders these groups into a prioritized ordered list (ST 410.) This important step determines the size of the bandwidth allocated for streams in each source-specific group and also influences the perceived AV quality.

Figure 24:
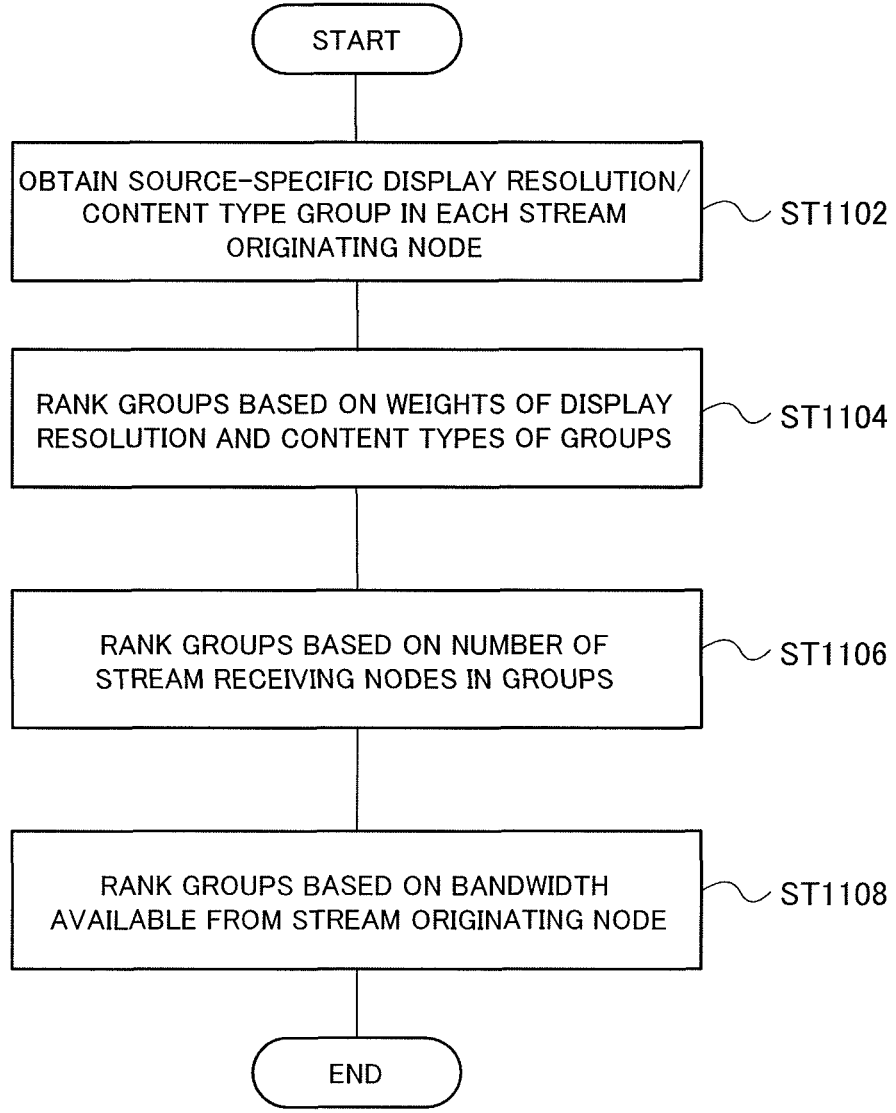
FIG. 24 illustrates a detailed process flow for ranking source-specific display resolution/content type groups.

FIG. 24 illustrates the detailed process flow for ranking source-specific display resolution/content type groups. First, source-specific display resolution/content type-based groups received from all stream originating nodes are referred (ST 1102.) These groups are ranked according to the weight of the display resolution/content type transmitted from each group (ST 1104.). According to the present embodiment, groups are ranked in ascending order starting from a group with a lower weight.

Next, a plurality of groups of the same weight are ranked again based on the number of stream receiving nodes registered in the groups in ascending order (ST 1106.) In order to form a complete group-based tree, the priority is defined based on the concept that a group with a smaller number of nodes is less likely to be an option for paths that should be selected.

Moreover, a plurality of groups having the same number of stream receiving nodes are ranked, based on the bandwidth available from stream originating nodes in ascending order (ST 1108.) The priority is defined based on the principle that a stream originating node with a smaller bandwidth available is given a higher priority to deliver content from itself first before relaying content for others.

Finally, each source-specific display resolution/content type group is assigned an index based on its rank, indicating its priority in group-based tree construction. During group-based tree construction, this ranking mechanism allocates the minimum but sufficient bandwidth to a lower display resolution/content type group, based on the weight. Meanwhile, the unselected logical streams for the group is released and redistributed to a higher display resolution/content type group. Therefore, the bandwidth added by the redistribution provides more bandwidth allocation to a higher display resolution/content type group, and it is possible to anticipate better perceived AV quality.

Upon assigning the rank to each group, stream coordinating node 502 transmits group priority reporting messages 526, 528, 530 to all stream originating nodes 504, 506, 508. Upon receiving this message, the stream originating node updates group priority table 362 for an additional reference to sequentially command to construct group-based trees. Moreover, each stream originating node distributes group information, that is, source-specific group list reporting messages 532, 534, to all stream receiving nodes 506, 508 in the group.

Stream receiving nodes 506, 508 receive the source-specific group list reporting messages 532, 534, from all stream originating nodes 504 having transmitted display resolution/content type reporting messages 510, 512. Next, stream receiving nodes 506, 506 construct logical streams (ST 412), and performs bandwidth estimation (ST 414.)

Figure 25:
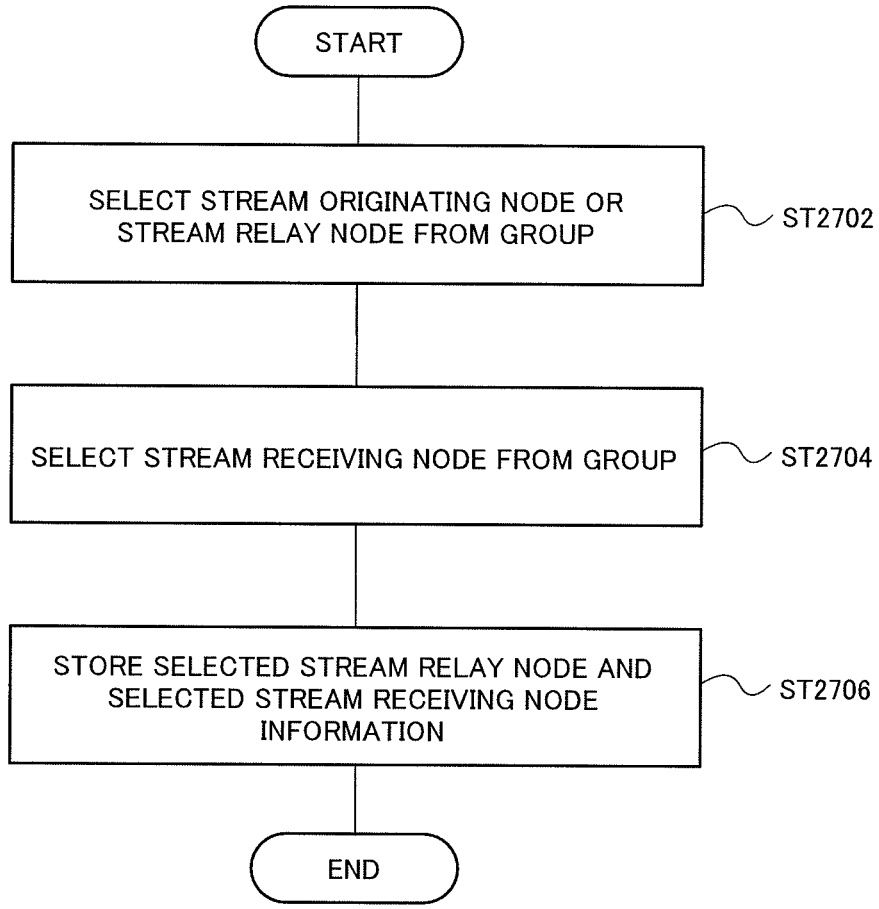
FIG. 25 is a drawing showing a logical stream construction process flow.

FIG. 25 shows a flow of logical stream construction process. All stream receiving nodes are regarded as stream relay nodes under this context, because in a group, each stream receiving node has the capability to further relay content to the next stream receiving node in the same group.

Meanwhile, a stream originating node constructs logical streams and estimates bandwidths like a stream relay node because a stream originating node is the source of content. Based on group list information, a stream originating node and each stream relay node (or stream receiving node) construct logical streams for all stream receiving nodes.

During construction of logical streams, a stream originating node or stream relay node itself is selected by default, as "sender node" in a logical stream (ST 2702.)

Next, a stream receiving node is selected from the group list, as "receiver node" in the logical stream (ST 2704.) The logical stream information from the two nodes are stored in stream table 368 and then updated in group table 364 and individual transmission source logical stream holding table 370 (ST 2706.)

Figure 26:
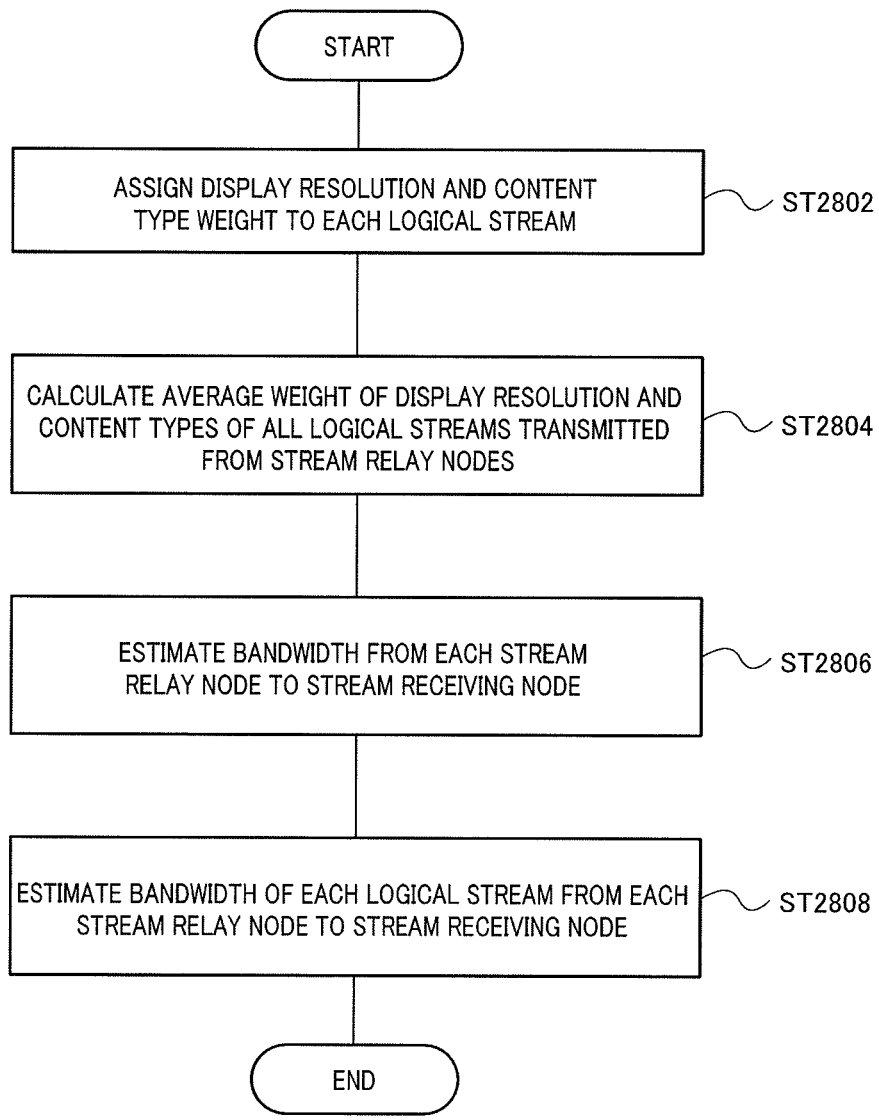
FIG. 26 is a drawing showing a process flow of bandwidth estimation.

Following this, a bandwidth is estimated (assessed) for all logical paths, in the specific stream originating node and stream relay node. FIG. 26 shows a flow of bandwidth estimation process.

According to the present embodiment, dynamic bandwidth estimation based on weighted ratio, according to display resolution and content types requested from stream receiving nodes, is adopted. Each logical stream is assigned a weight according to the delivered display resolution and content type (ST 2802.) There may be a plurality of logical streams that transmit or relay different display resolution/content types in a stream originating node and a stream relay node. Therefore, the average weight of display resolutions and the average weight of content types of all logical streams are calculated (ST 2804.)

Next, logical streams are further divided into groups based on the display resolution/content types of their stream receiving node. The average weight of display resolutions and the average weight of content types of all logical streams in each group are calculated.

Next, the proportion of the bandwidth provided for each stream receiving node is estimated by dividing the average display resolution weight and the average content type weight previously calculated by the reference weight, and multiplying the divided result by the provided bandwidth (ST 2806.)

In addition, the proportion of the bandwidth provided for stream receiving nodes is shared with logical streams transmitting content to stream receiving nodes. Next, the proportion of the bandwidth provided for each logical stream is estimated by dividing the display solution weight and the content type weight of each logical stream by the reference weight, and multiplying the divided result by the bandwidth provided to the stream receiving node (ST 2808.)

An estimated bandwidth reporting messages are transmitted from the stream originating node and stream relay nodes to all stream receiving nodes 536, 538, 540. In addition, upon receiving the message, the estimated bandwidth information per logical stream is updated in estimated bandwidth table 372 in a stream receiving node.

Upon completion of the bandwidth estimation process, group-based tree construction is commanded. To be more specific, based on the group priority defined for each source-specific display resolution/content type group, group-based tree construction is automatically commanded by the stream originating node ranked first in the priority list (ST 416.)

Figure 27:
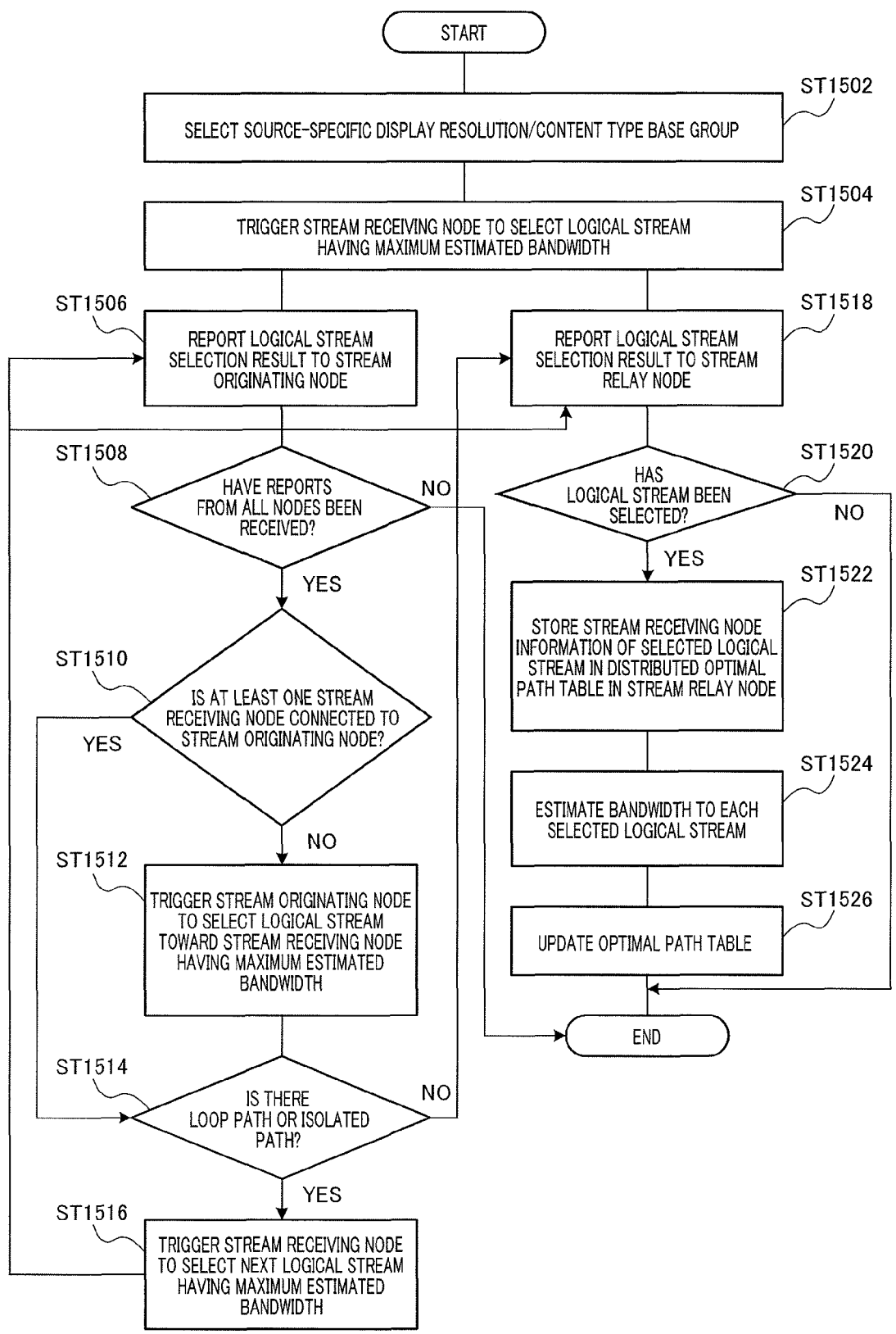
FIG. 27 is a drawing showing a detailed process flow of group-based tree construction.

FIG. 27 illustrates a detailed process flow of group-based tree construction. Referring to the group priority table, a stream originating node selects a source-specific display resolution/content type group, based on the order of priority (ST 1502). Group-based tree construction invoking selection messages 542, 544 are transmitted by a stream originating node to all stream receiving nodes in the selected group.

Status 1604 field in the group-based tree construction invoking selection message is set to "start" indicating the start of group-based tree construction. Based on the group ID 1602, the related logical stream corresponding to this group and its estimated bandwidth are identified from group table 364 and estimated bandwidth table 372 in a stream receiving node. In addition, the stream receiving node selects the logical stream having the maximum estimated bandwidth, in parallel (ST 1504).

Next, each stream receiving node transmits group-based tree construction stream selection messages 548, 550 having status 1604 field set to "selection." These messages 548, 550 are transmitted (546, 548) to the stream originating node of the selected logical stream, and the stream relay nodes of the group (ST 1506, ST 1518).

In a certain situation, communication nodes in a group leave a ALM session during group-based tree construction. At this time, the communication nodes in the group report another group-based tree construction invoking selection messages 542, 544 having status 1604 field set to "halt", to all active communication nodes. Then, the group-based tree construction process is halted and restarted.

Otherwise, upon completion of group-based tree construction, the stream originating node performs following processing. In order to report to all communication nodes in the group, the stream originating node transmits group-based tree construction invoking selection messages 542, 544 having status 1604 field set to "end" on an as needed basis.

Stream relay nodes receive group-based tree construction stream selection messages 548, 550 having status 1710 set to "selection" (ST 1520: YES.) Next, stream relay nodes store stream receiving node information in distributed optimal path table 374 (ST 1522.) On the other hand, status 1710 is not set to "selection" (ST 1520: NO), the group-based tree construction is ended.

The stream originating node checks if group-based tree construction stream selection messages have been received from all the stream receiving nodes in the group (ST 1508.) If the group-based tree construction stream selection messages have not been received from all the stream receiving nodes in the group (1508: NO), the group-based tree construction is ended.

On the other hand, if the group-based tree construction selection messages have been received (ST 1508: YES), the stream originating node checks if at least one stream receiving node is connected to the stream originating node (ST 1510.) This step is important to prevent group-based tree construction from not having connection to the content source.

If at least one stream receiving node is connected to the stream originating node (ST 1510: YES), the stream originating node checks if there is a loop path or isolated path in the selected logical stream (ST 1514.) On the other hand, if there is no receiving node connected to the stream originating node (ST 1510: NO), the stream originating node command to select the logical stream for the stream receiving node having the maximum estimated bandwidth (ST 1512.)

Next, the stream originating node checks if there is a loop path or isolated path in the selected logical stream (ST 1514.) If there is a loop path or isolated path (ST 1514: YES), a group-based tree construction stream selection message is transmitted (554) to each stream receiving node having the group ID set to the source-specific display resolution/content type group ID and the status set to "reselection." The stream receiving node is commanded to select the logical stream having the next maximum estimated bandwidth (ST 1516.)

The stream originating node and the stream relay node of newly selected logical streams are reported by a group-based tree construction stream selection message having the status set to "selection" (546.) The stream relay node having been selected by each stream receiving node receives (552) a group-based tree construction stream selection message from the stream originating node having the group ID set to the source-specific display resolution/content type group ID and the status set to "removal."

If there is no loop path or isolated path (ST 1514: NO), the stream originating node commands to fix the estimated bandwidth. To be more specific, the stream originating node commands to all the stream relay nodes in the group to set the estimated actual bandwidth to the minimum bandwidth estimated among logical streams. Based on the path formed by selected logical streams, a path ID is allocated to each branch originating from the stream originating node in the group-based tree.

The stream originating node transmits final group-based tree construction stream selection messages 552, 554 to all the stream relay nodes in the group having group ID 1702 set to the source-specific display resolution/content type group ID; stream ID 1704 set to the stream ID of each selected logical stream; path ID 1706 set to the allocated ID; actual bandwidth 1708 set to the final allocated bandwidth; and status 1710 set to "final" (ST 1518.)

Status 1604 in the group-based tree construction stream selection message, which is transmitted from the stream originating node is finally checked in the stream relay node having received information (ST 1520.) If status 1604 indicates "selection" (ST 1520: YES), the stream relay nodes store stream receiving node information in distributed optimal path table 374 in each stream relay node (ST 1522.) In addition, the stream relay nodes estimate bandwidths for respective selected logical streams (ST 1524). Distributed optimal path table 374 in each stream relay node is updated by each update report (ST 1526.)

Upon receiving the final group-based tree construction stream selection message, each stream relay node checks if all logical streams have been constructed (ST 418.) If there are still logical streams (ST 418: NO), each stream relay node in the group removes unselected logical streams. Next, each stream relay node in the group is commanded to redistribute the remaining bandwidth to logical streams in an unprocessed source-specific display resolution/content type group (ST 420.) As described above, the bandwidth estimation process (ST 414) is performed again.

The stream originating node which has completed the group-based tree construction commands the stream originating node in the next group to construct the next source-specific display resolution/content type group-based tree construction. To be more specific, the stream originating node transmits the group-based tree construction message as shown in FIG. 22 (556.) In the group-based tree construction message shown in FIG. 22, current group ID 1802 is set to the group ID of the current group which has completed the group-based tree construction, by referring to the group priority table. Next group ID 1804 is set to the group ID of the subsequent source-specific display resolution/content type group in the priority list.

Figure 28:
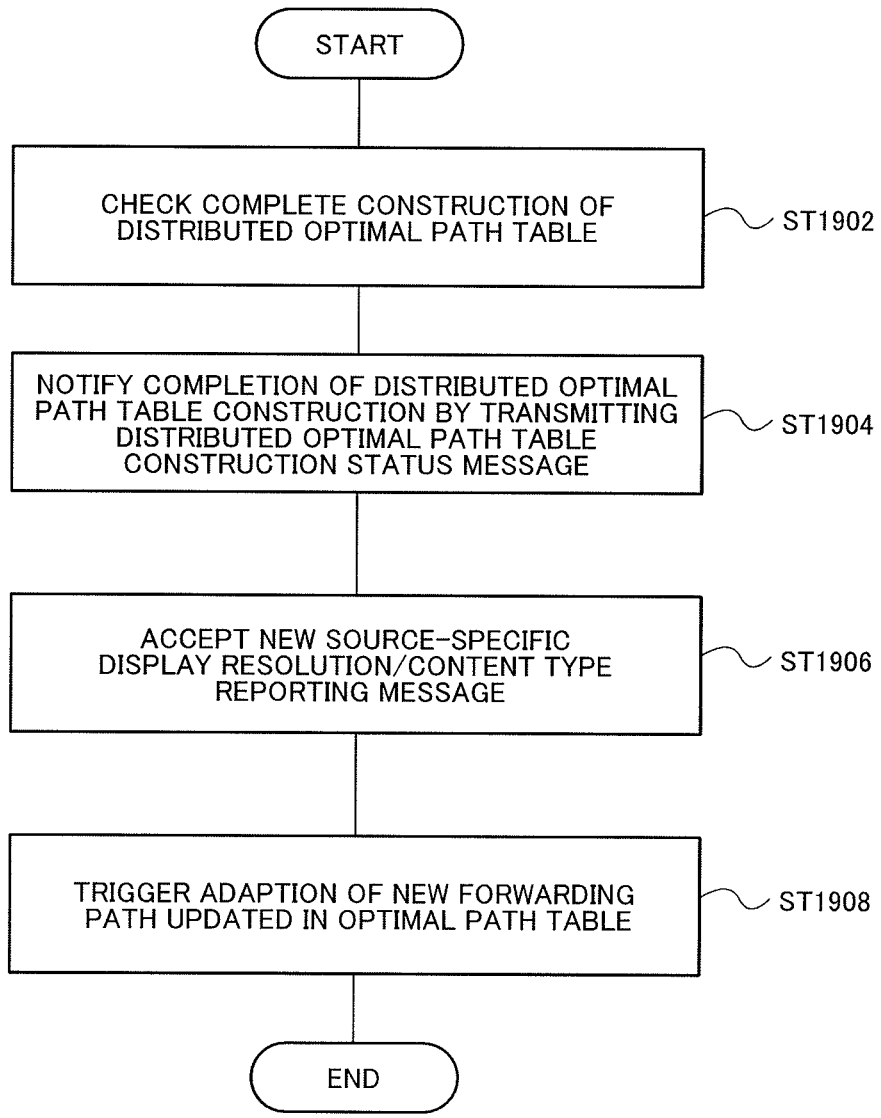
FIG. 28 is a drawing showing a detailed process flow of notifying completion of a distributed optimal path table construction.

FIG. 28 shows a detailed process flow of reporting completion of distributed optimal path table construction.

Upon completion of distributed optimal path table construction (ST 418: YES, ST 1902), the stream originating node in the last group in the priority list commands to report the end of distributed optimal path table construction (ST 1904.) A distributed optimal path table construction status message (shown in FIG. 15) composed of ALM session ID 902 and status 904 set to "change-on" is delivered to all participating nodes (558, 560.) Here, "change-on" represents that request to further change of display resolution and content types is allowed.

When stream relay nodes and the stream originating node transmit this message, all subsequent display resolution/content type reporting messages are accepted, according to the display quality/content type (ST 1906.) After that, the stream originating node commands to construct the next round of distributed optimal path table creation (ST 1908) and identifies fair bandwidth allocation. Meanwhile, a forwarding path newly constructed in the optimal path table is referred to transmit content subsequently.

As described above, according to the present embodiment, the communication path construction apparatus has forwarding table construction controller 316 that controls distributed optimal path table construction over a plurality of communication nodes; group constructor 308 that assigns communication nodes to source-specific groups and prioritizes the source-specific groups, based on the display resolution/content type of each communication node; bandwidth estimator 322 that estimates the bandwidth available for logical streams between communication nodes; and forwarding table constructor 328 that constructs a distributed optimal path table based on the priorities of the source-specific groups.

Stream receiving nodes are classified into a plurality of source-specific display resolution/content type groups (specific-source groups) based on the display resolution and content type of each communication node set by application or user environmental setting. Next, as for stream receiving nodes, the groups are prioritized based on the priority of each display resolution/content type. Moreover, a group-based tree of each source-specific display resolution/content type group is constructed based on the priority.

Moreover, it is possible to construct a group-base tree of each source-specific group based on the priority of each source-specific group, so that it is possible to complete construction of trees by significantly a smaller number of steps than in a round robin method. In addition, it is possible to perform N-tree construction in a distributed manner, so that it is possible to prevent a specific communication node from being loaded. At this time, allocation of the maximum bandwidth available for the network path between the stream originating node and the stream receiving node allows good AV quality.

Here, it is ascertained through our evaluation experiment that the time required to construct an N-tree with twelve nodes is 50 ms using general CPUs, and therefore it is possible to construct an N-tree in a practical calculation time.

In addition, according to the present embodiment, after each group-based tree is constructed, unselected candidate paths are removed in each group-based tree, and the unused estimated bandwidth of the removed candidate network paths are redistributed to other candidate network paths, based on the priority. By this means, according to the present embodiment, it is possible to improve efficiency of use of bandwidths.

In addition, according to the present embodiment, event if display resolution and content types are changed, for example, at the initiative of the user, a source-specific group is reconstructed, according to the display resolution and content type newly requested. According to the present embodiment, this allows the optimal bandwidth allocation, so that it is possible to adaptively change allocated bandwidths, based on requested display resolution and content types. By this means, according to the present embodiment, it is possible to provide good perceived AV quality while supporting the display resolution and content type requested from the user.

Therefore, for example, when participants construct and customize own various continuous presence layouts in a multi-party ALM video conferencing session, it is possible to provide good perceived AV quality.

Moreover, by coordinating coding parameters (i.e. coding bit rate, image resolution and frame rate) according to allocated bandwidths, it is possible to increasingly improve AV quality.

The communication path construction apparatus and the N-tree construction method according to the present invention can include a plurality of disconnected or single connected product code(s) that is (are) not required to be placed physically together with in an apparatus, but forms module when being logically connected to the apparatus and is stored in an integrated circuit or device set to realize the defined purpose for the module.

The disclosure of Japanese Patent Application No. 2008-160916, filed on Jun. 19, 2008, including the specification, drawings and abstract, is incorporated herein by reference in its entirety.

Industrial Applicability

The communication path construction apparatus and the N-tree construction method according to the present invention are able to provide good perceived AV quality while assuring fair bandwidth allocation, and are useful to ALM optimal path construction and so forth.

Reference Signs List

102, 104, 106, 108, 214, 216, 218, 220 Communication node
110 Network
202, 204, 206 Group
316 Forwarding table construction controller
308 Group constructor
322 Bandwidth estimator
328 Forwarding table constructor
334 Forwarding executor
340 Display resolution/content type trigger monitor
358 Display resolution/content type rule table
360 Content group table
362 Table priority table
364 Group table
368 Stream table
370 Individual transmission source logical stream holding table
372 Estimated bandwidth table
374 Distributed optimal path table
376 Media application

The invention claimed is:

1. A communication path construction apparatus comprising:
 a forwarding table construction controller that controls a start or end of construction of a distributed optimal path table over a plurality of communication nodes;
 a group constructor that assigns each of the plurality of communication nodes to at least one of source-specific groups, based on a display resolution and a content type of each of the plurality of communication nodes, and prioritizes the source-specific groups;

a bandwidth estimator that estimates a bandwidth available for each of a plurality of logical streams, each logical stream being formed between any two of the plurality of communication nodes; and a forwarding table constructor that, together with the forwarding table construction controller, constructs the distributed optimal path table, based on the priorities of the source-specific groups and the estimated bandwidths.

2. The communication path construction apparatus according to claim 1, wherein the forwarding table construction controller commands to start or end constructing the distributed optimal path table by transmitting a distributed optimal path table construction status message.

3. The communication path construction apparatus according to claim 2, wherein the forwarding table construction controller:

receives a source-specific display resolution/content type reporting message; and commands to start constructing the distributed optimal path table.

4. The communication path construction apparatus according to claim 3, wherein the forwarding table construction controller:

identifies completion of construction of the distributed optimal path table;

reports the completion of construction of the distributed optimal path table; and commands to start reconstructing the distributed optimal path table after reporting use of the distributed optimal path table constructed.

5. The communication path construction apparatus according to claim 2, wherein the distributed optimal path table construction status message includes:

a session ID field that represents a unique identifier for a communication session between at least two of the plurality of communication nodes; and a status field that indicates a start or end of construction of the distributed optimal path table.

6. The communication path construction apparatus according to claim 1, wherein the group constructor:

receives the display resolution and content type of each of the plurality of communication nodes;

forms the source-specific groups based on the display resolution and content type of each of the plurality of communication nodes; and reports group information in the source-specific groups to the plurality of communication nodes.

7. The communication path construction apparatus according to claim 1, wherein the group constructor:

forms the source-specific groups based on the display resolution and content type of each the plurality of communication nodes and assigns a weight to each source-specific group;

prioritizes the source-specific groups based on the weight of each source specific-group; and reports the priorities of the source-specific groups to the plurality of communication nodes through a group priority reporting message.

8. The communication path construction apparatus according to claim 7, wherein the group constructor prioritizes the source-specific groups by:

ranking the source-specific groups, in ascending order, based on the weight of each source-specific group;

ranking the source-specific groups, in ascending order, based on a number of stream receiving nodes among the plurality of communication nodes in each source-specific group; and ranking the source-specific groups, based on an estimated bandwidth available for a stream originating node among the plurality of communication nodes.

9. The communication path construction apparatus according to claim 7, wherein the group priority reporting message includes:

a source ID field that represents a unique identifier for a stream originating node among the plurality of communication nodes;

a group ID field that represents a unique identifier for each source-specific group; and a priority field that indicates ascending orders of the source-specific groups when the distributed optimal path table is constructed.

10. The communication path construction apparatus according to claim 1, wherein the band estimator:

constructs a logical stream between the plurality of communication nodes in a same source-specific group; and estimates a bandwidth allocated to each of a plurality of logical streams in the source-specific group and reports the bandwidth to the plurality of communication nodes through an estimated bandwidth reporting message.

11. The communication path construction apparatus according to claim 10, wherein the bandwidth estimator:

assigns a weight of display resolution and content type to each of a plurality of logical streams in a stream originating node and a stream relay node among the plurality of communication nodes, based on the display resolution and the content type; and calculates an estimated bandwidth of each the plurality of logical streams in the stream originating node and the stream relay node, based on the weight of display resolution and content type.

12. The communication path construction apparatus according to claim 10, wherein the estimated bandwidth reporting message further includes:

a sender ID field that represents a unique identifier for a stream relay node among the plurality of communication nodes;

a group ID field that represents a unique identifier for the source-specific group;

a stream ID field that represents a unique identifier for each of a plurality of logical streams to transmit the display resolution and the content type for the source-specific group, from the stream relay node to a stream receiving node; and a bandwidth slot field that indicates a maximum estimated bandwidth available for each of the plurality of logical streams.

13. The communication path construction apparatus according to claim 1, wherein the forwarding table constructor:

commands to construct group-based trees for the source-specific groups through a group-based tree construction message, based on the priorities of the source-specific groups;

constructs the group-based trees for the source-specific groups; and constructs the distributed optimal path table.

14. The communication path construction apparatus according to claim 13, wherein the forwarding table constructor:

designates a stream receiving node through a group-based tree construction invoking selection message, in order to select a logical stream having a maximum estimated bandwidth in the source-specific groups;

reports a logical stream selection result to a stream relay node and a stream originating node through a group-based tree construction stream selection message;

distributes a bandwidth allocated to each of a plurality of selected logical streams, based on the logical stream selection result;

redistributes an unused logical stream bandwidth to a logical stream in an unused source-specific group; and constructs the group-based trees for the source specific groups.

15. The communication path construction apparatus according to claim 14, wherein the group-based tree construction stream selection message includes:

a group ID field that represents a unique identifier for each source-specific group designated to construct the group-based tree;

a stream ID field that represents a unique identifier for each of the plurality of selected logical streams;

a path ID filed that represents a unique identifier for the logical stream;

an actual bandwidth allocated to a specific logical stream; and a status field that indicates a status of construction of the group-based tree for each source-specific group.

16. A method for constructing a distributed optimal path table, comprising:

assigning each of a plurality of communication nodes to at least one of source-specific groups, based on a display resolution and a content type of each of the plurality of communication nodes, and prioritizing the source-specific groups;

estimating a bandwidth available for each of a plurality of logical streams, each logical steam being formed between any two of the plurality of communication nodes; and constructing the distributed optimal path table over the plurality of communication nodes, based on the priorities of the specific-source groups and the estimated bandwidths.

* * * * *